July 17, 1956  C. E. WEBB  2,754,562
PIPE EXTRUSION APPARATUS
Filed March 12, 1952  12 Sheets-Sheet 7
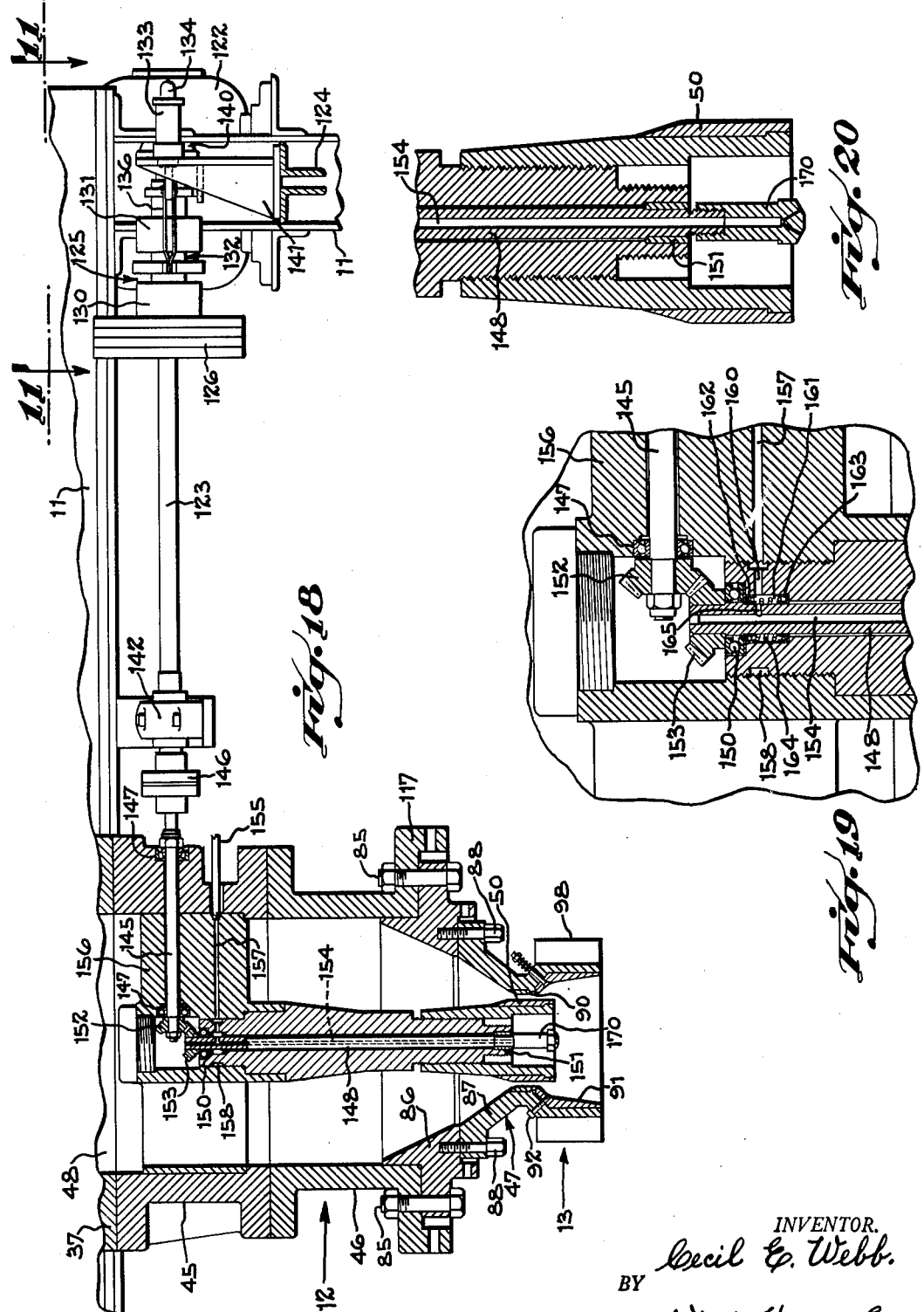
INVENTOR.
Cecil E. Webb.
BY
Wood, Herron & Evans.
ATTORNEYS.

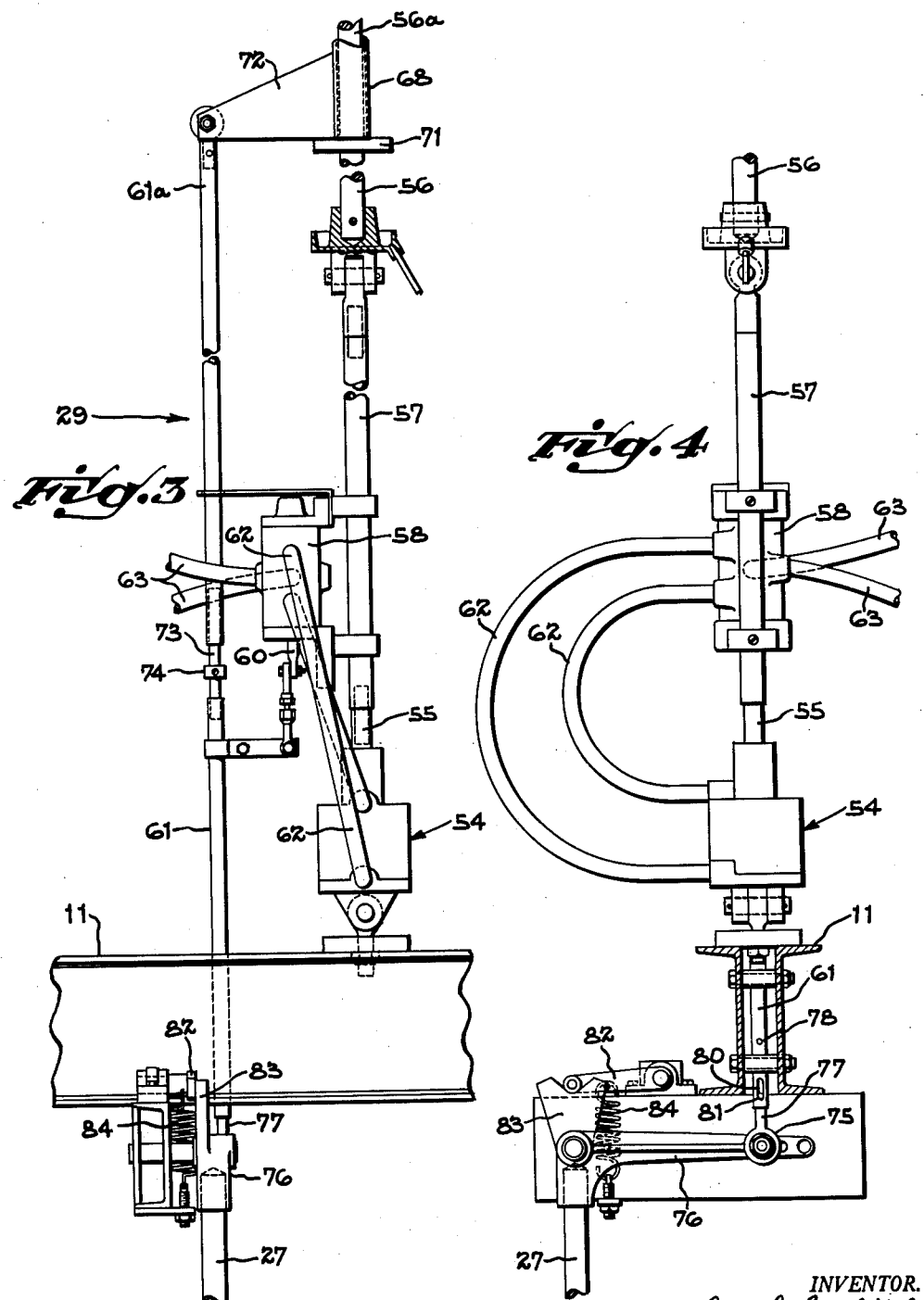

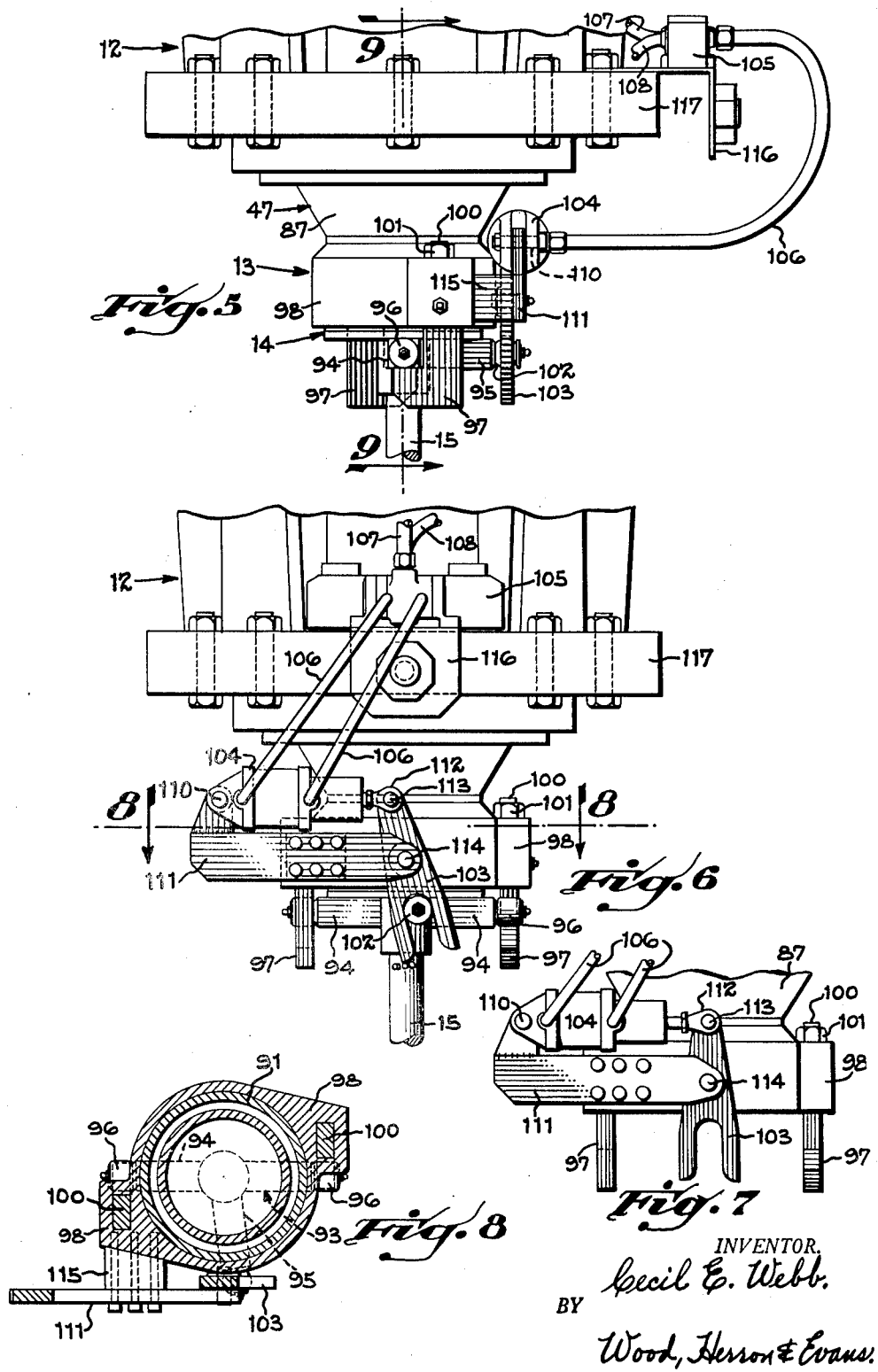

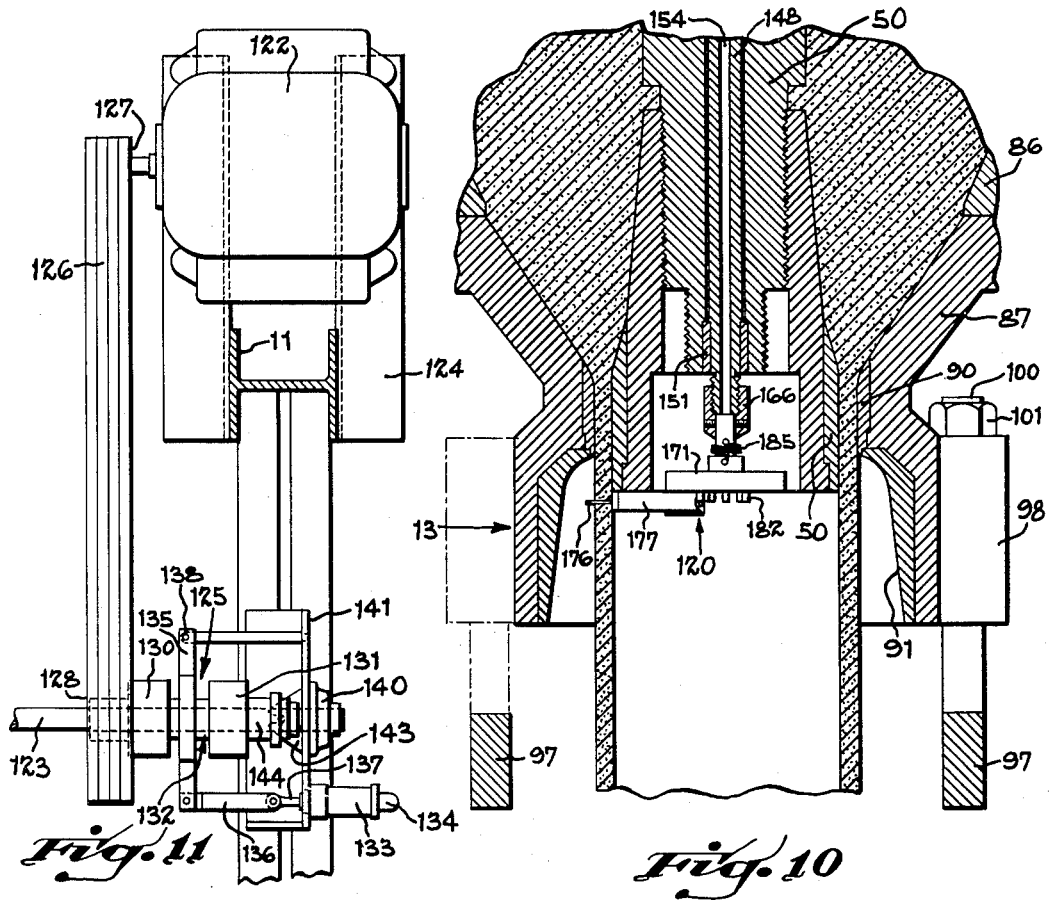
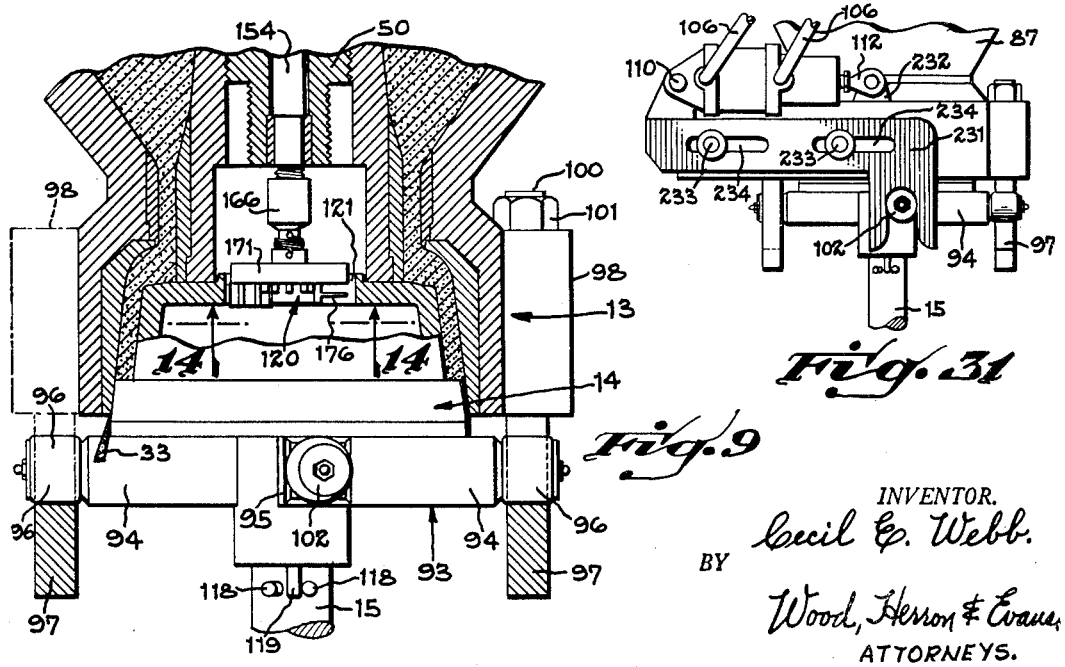

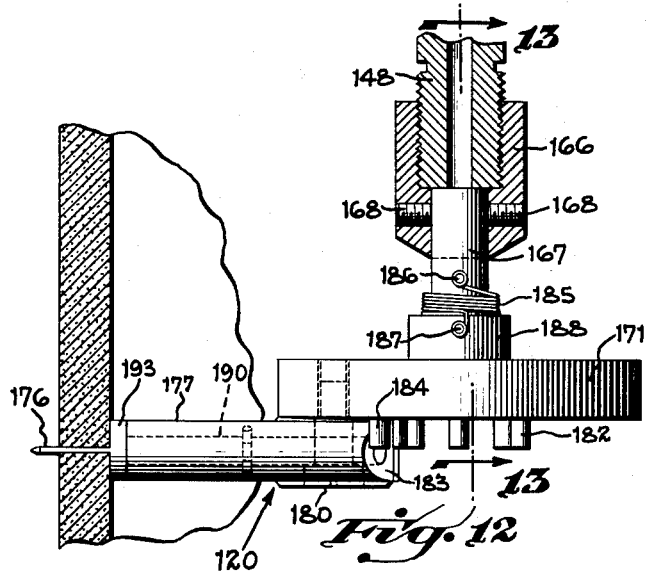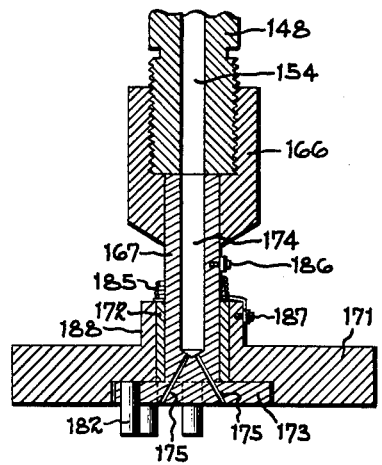

July 17, 1956 — C. E. WEBB — 2,754,562
PIPE EXTRUSION APPARATUS
Filed March 12, 1952 — 12 Sheets-Sheet 8
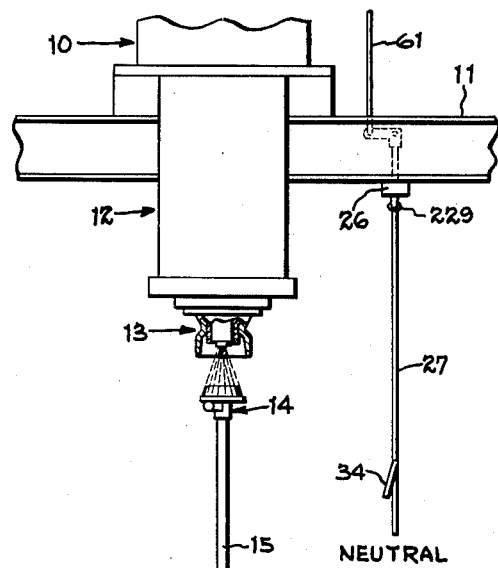
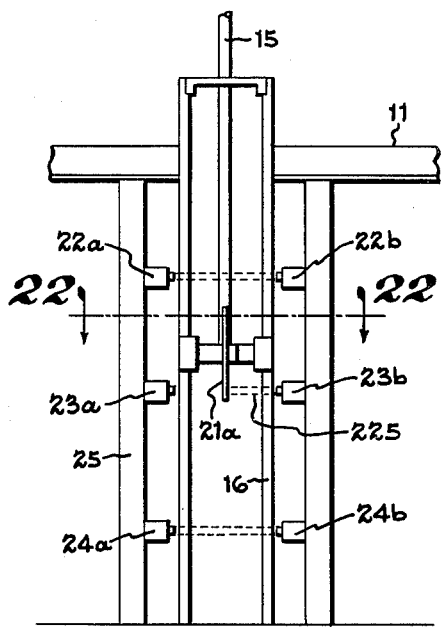
Fig. 21
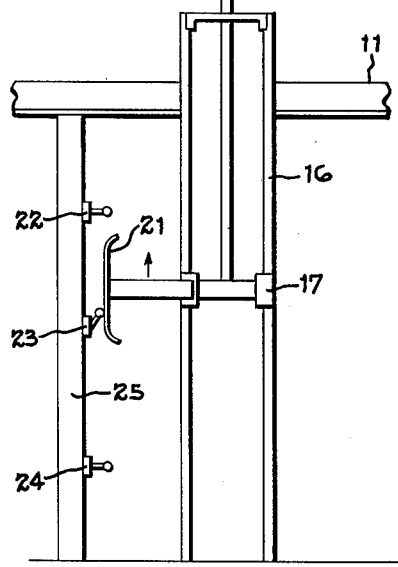
Fig. 23
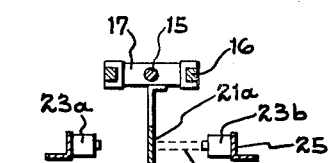
Fig. 22
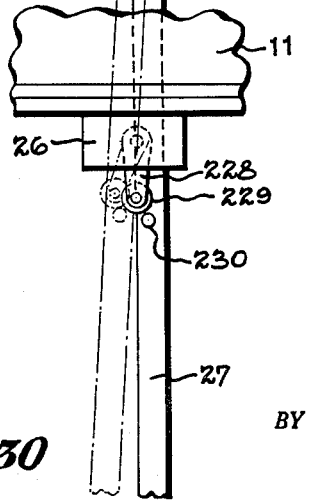
Fig. 30
INVENTOR.
Cecil E. Webb.
BY
Wood, Herron & Evans,
ATTORNEYS.

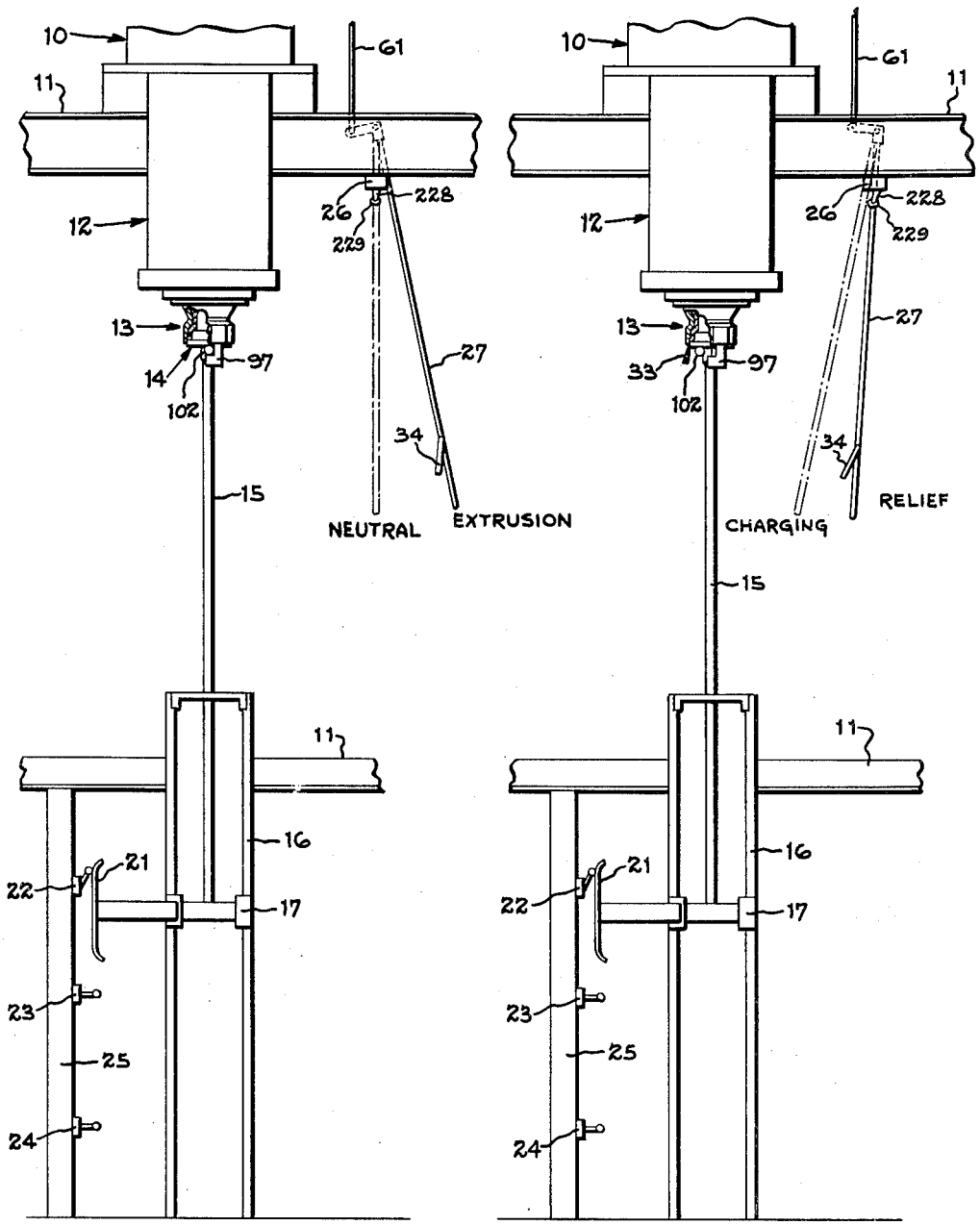

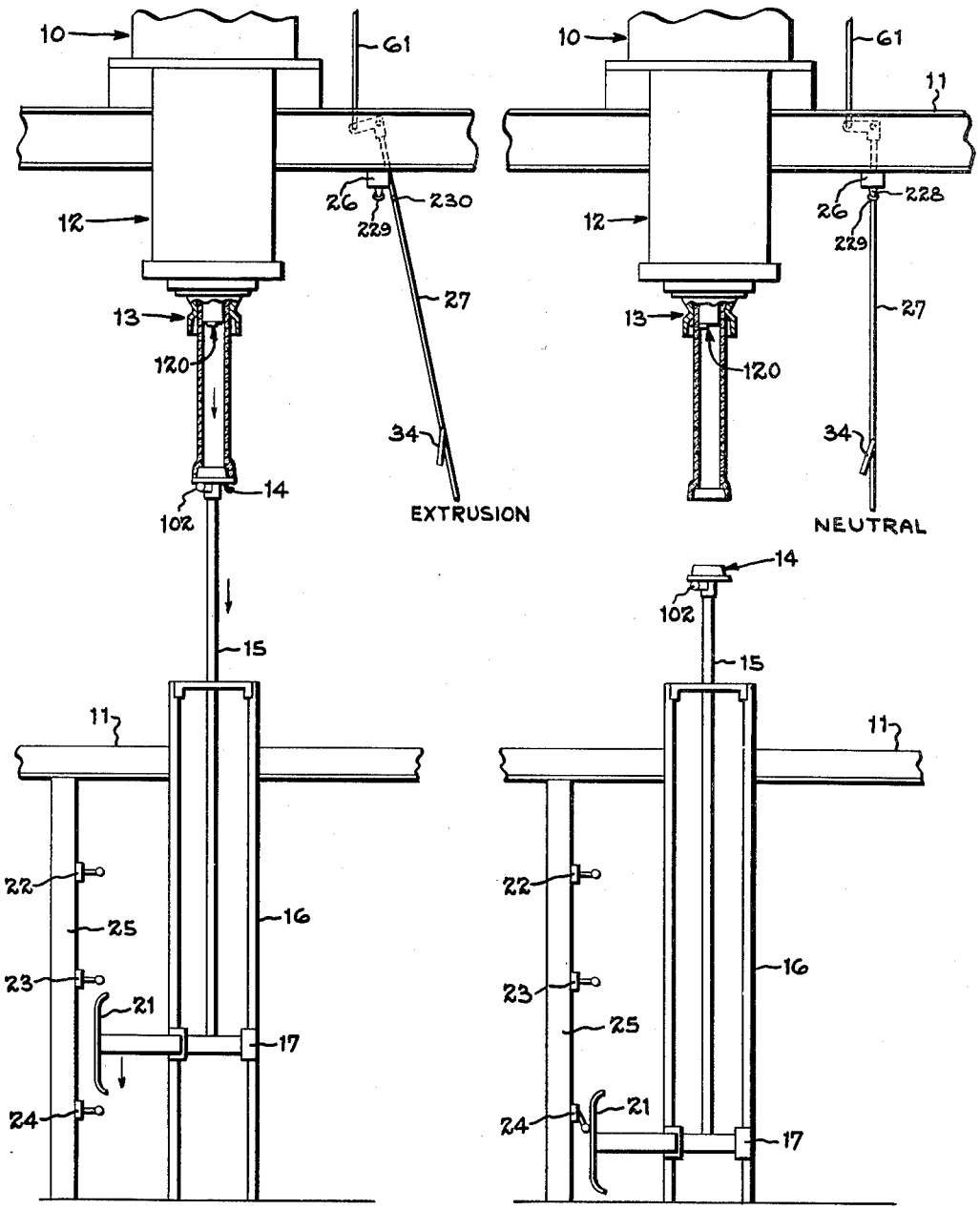

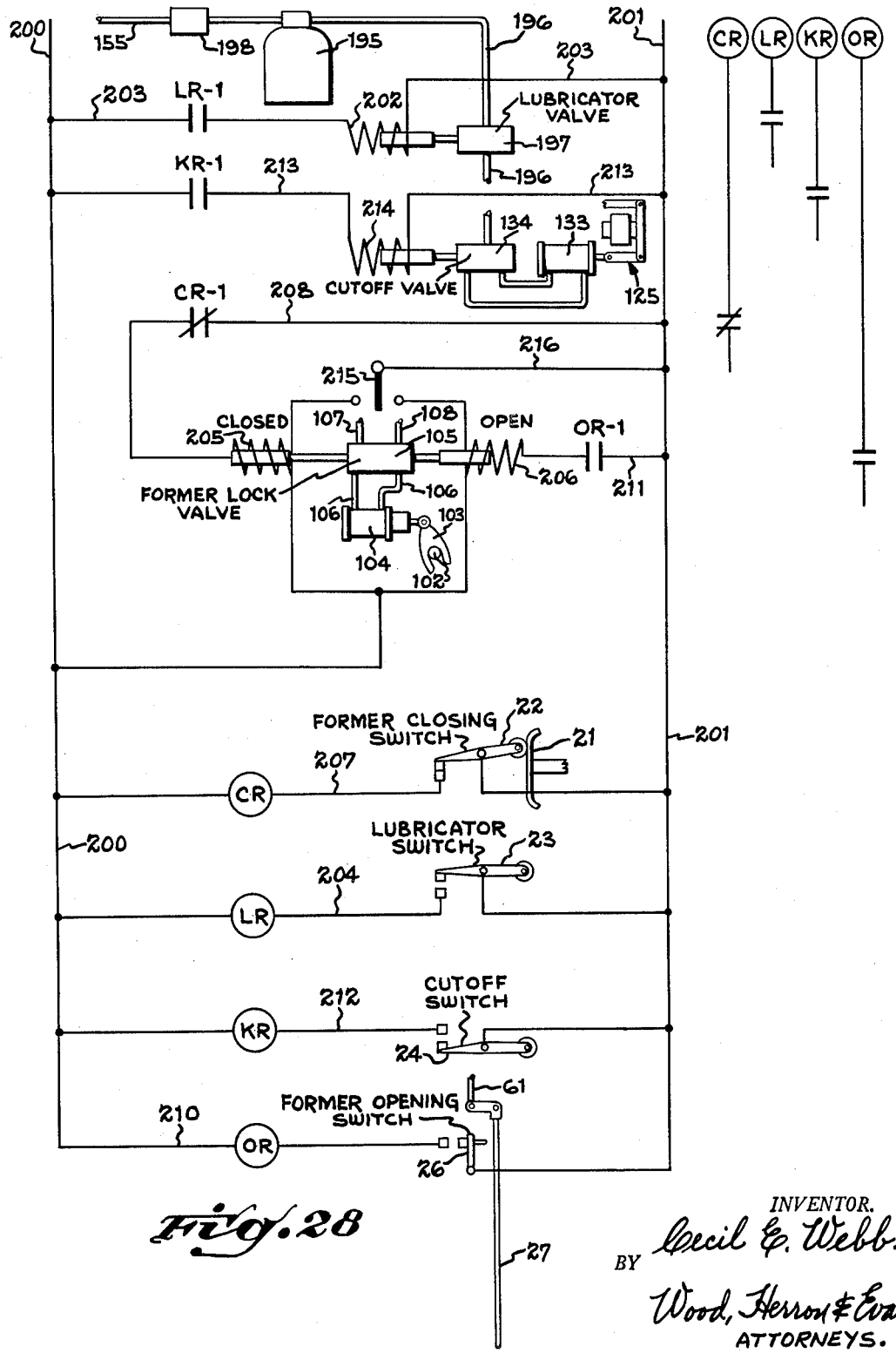

United States Patent Office 2,754,562
Patented July 17, 1956

2,754,562

PIPE EXTRUSION APPARATUS

Cecil E. Webb, Cincinnati, Ohio, assignor to M. S. Bowne, Clearfield, Ky., trustee Application March 12, 1952, Serial No. 276,118

12 Claims. (Cl. 25—39)

This invention relates to the manufacture of ceramic pipes and is directed particularly to the automatic or partially automatic extrusion of plastic clay pipes which consist of a tubular column having an enlarged coupling socket formed at one end as an integral part of the pipe.

Ceramic pipes of this type are well known and are used principally as sewer pipes, the extruded pipes being dried, hardened by firing, and usually glazed to make them non-porous. The socket has an inside diameter larger than the outside diameter of the column and provides a telescopic connection with the column portion of an adjoining pipe when the pipes are laid end-to-end such that the pipes can be coupled together and sealed at the sockets to form continuous sewer lines or drainage systems.

Sewer pipes have been manufactured for many years by the use of clay extrusion machines, the enlarged socket being formed by expressing the plastic clay directly from the extruder under high pressure into a separable die known in the industry as a "former die." After the socket is molded in the former die, the die is separated and the column portion of the pipe is extruded as an integral part of the socket; in other words, each pipe requires a socket molding operation and a column extruding operation.

This process involves a sequence of hand operations or steps which constitute a complete cycle of operation upon the extrusion and removal of each pipe. In the present apparatus, these operations are executed in a rapid sequence automatically; however, a brief outline of the machine and the hand operations performed in operating it will bring out more clearly the basic principles of automatic operation.

The invention is disclosed, as a preferred embodiment, in relation to a commonly used steam extruder which is normally operated by hand but which is converted to automatic operation by the present apparatus. In general, the steam extruder consists of a vertical steam cylinder having a reciprocating piston which is connected at its lower end to a ram, the ram, in turn, being reciprocated with respect to a vertical extrusion chamber. The plastic clay is contained in the extrusion chamber and is expressed under high pressure upon downward movement of the ram. Ram movements are regulated by a reversible steam valve which is connected to a press control lever for regulation by the press operator.

Plastic clay is charged into the upper end of the extrusion chamber when the ram is elevated above the chamber to a charging position; upon downward movement of the ram, the clay is trapped in the chamber beneath the ram and forced outwardly through an extrusion die mounted upon the lower end of the chamber. The extrusion die delineates the inside and outside diameters of the column and is interchangeably mounted upon the chamber so that various pipe diameters may be extruded by installing suitable extrusion dies.

It will be understood that the sewer pipes range in size from relatively small to large diameters which are heavy and difficult to handle. The present automatic apparatus is adapted to be used in the production of the various diameters and lengths by making suitable adjustments as described later.

The former die is mounted directly upon the lower end of the extrusion die and is adapted to mold the outside diameter of the socket. The inside diameter of the socket is molded by a male element commonly called the "former cap." The former cap is movable axially with respect to the former die and nests within it, sealing off the lower end of the die. Thus plastic clay is confined in the annular space between the cap and die when it is expressed under high pressure from the extrusion die into the closed former die.

The former die includes a former lock which clamps the cap firmly to the die while the socket is being molded. After the socket is formed, the former lock is released and as the column portion of the pipe is extruded, the column of clay issuing from the extrusion die forces the cap away from the die with the socket seated upon the cap.

The former cap is mounted upon a vertical guide rod which is slidably confined in a guide way by a crosshead secured to the lower end of the rod. The guide rod thus is guided in coaxial alignment with the former die so that the cap is shifted back into registry with the die after each pipe is extruded. A counter weight is arranged to move the cap back to the die by gravity in an automatic manner after each extrusion operation.

In manual operation of the steam press, the press operator regulates the ram by movements of the press lever and a helper locks and unlocks the former cap in time with the movement of the lever; thus the two men must work together as a closely integrated team. Basically each extruded pipe requires the following sequence of interrelated operations. First, the lock operator locks the former cap in closed position; second, the press operator extrudes plastic clay into the closed former die to mold the socket; third, the press operator releases extrusion pressure to permit the former cap to be unlocked; and fourth, the lock operator unlocks the cap. As soon as the cap is unlocked, the press operator extrudes the column to the desired length and then returns the lever to a neutral position, leaving the extruded pipe hanging from the die. The extruded pipe is now broken off and removed by one or a group of workmen before the cap moves back by gravity to the former die.

In addition to these operations, it is also necessary for the lock operator, or another helper, to apply lubricant to the surface of the former die and former cap to prevent the adhesion of the plastic clay to the die surfaces. This operation is performed manually, by means of a brush before the cap is locked to the die, preferably at the start of each operation.

It will be observed, from this brief outline, that rapid production of pipes depends chiefly upon close coordination between the press operator, who is the key man, the lock operator, and the break-off man since each step is dependent upon the preceeding steps.

Critical timing of each man in the production team is absolutely requisite if a high rate of production is to be obtained. Frequent recess periods are necessary in order for the workmen to maintain the tempo during press operation. Obviously, the human factor is an important consideration in the production schedule of any plant, and it varies widely from day to day for that reason.

In its broadest aspects, a primary objective of the present invention has been to provide an automatic control apparatus which is adapted to lock the former cap, unlock the former cap, rotate a cutoff knife and apply the lubricant to the dies in rapid sequence in response to the operation of the press lever and movement of the former cap so that the entire cycle is under the control of the press operator.

It has been determined that an unexpected increase in production efficiency is gained by automatic operation because the several related steps do not depend upon the coordinated movements of two or more individuals, but, instead, are all under the direct control of the press operator. Critical sequence in the timing of successive operations is removed from various individual workmen and is placed within the direct control of a single workman who is independent of the others. In actual practice the pipes are extruded under automatic control at a rate which keeps the former cap in a state of constant reciprocation; in spite of the output speed, the quality of pipes is improved because of the closer control effected by the automatic apparatus.

In short, the automatic apparatus allows one man to operate the press at maximum capacity and to produce pipes of improved quality. It also releases the lock operator for other duties and thereby ultimately increases the number of pipes produced per man-hour. Automatic cutting of the pipes eliminates spoilage because in breaking them off at the die by hand, a certain percentage of the pipes were bent and rendered unusable. Automatic lubrication of the dies is more efficient and eliminates spoilage due to the socket sticking to the former dies.

It must be borne in mind that the operation of a conventional steam press requires considerable skill, experience, and delicacy of control. Imperfect results are obtained if extrusion pressure is applied too rapidly, or too slowly, or for too long a period of time. The necessity for refilling the extrusion chamber of the steam press with new charges of clay from time to time constitutes an interruption which periodically interferes with continued cyclic operations. In order that full advantage may be realized from the experience and skill of a good press operator, another primary objective of the present invention has been to provide an automatic mechanism which will enable the press operator to manipulate the control lever in exactly the same manner as he has manipulated it in manual sequence production.

In its simplest aspect, the present invention resides in an apparatus employing fluid pressure valves and cylinders which are operable to lock the former cap, unlock the cap, drive a cutoff knife, and apply the lubricant to the dies in predetermined sequence during each automatic cycle of operation. The valves in turn, are regulated by electrical switches which are tripped in response to the vertical movement of the former cap and in response to certain movements of the press lever.

Briefly described, an automatic cycle of operation starts with the former cap locked to the die, the first step being to move the press lever to extruding position to form the socket. As soon as the socket is formed, the press lever is moved to relief or charging position, tripping the switch, which unlocks the cap coincidentally with the release of clay pressure within the former die. As soon as the die is unlocked, the lever is again moved to extruding position, causing the column to be extruded.

When the required column length is extruded, the press lever is moved to neutral and the cap continues moving downwardly by momentum so as to trip the cutoff knife switch, causing the column to be severed. During the return movement of the cap, the lubricator valve is tripped then the cap locking switch is tripped when the cap strikes the die. Thus, the die surfaces are lubricated and the cap is locked to the former die automatically at the end of one cycle ready for the start of the next cycle.

An important aspect of the invention relates to the electrical control system interconnecting the automatic switches arranged to place the operation of the cutoff knife and former unlocking under the direct control of the press operator.

Manual control of the knife and former lock is necessary in extruding the large diameter pipes in which the extrusion rate is too slow to move the former cap to its lower limit of travel to trip the switch; thus the operator energizes the knife when the column is extruded to full length by manually tripping a switch. Also, by manually controlling the cutoff knife, the operator is able to extrude pipes to any desired length, short of that produced by automatic knife operation, by actuation of the manual switch. In other words, the operator cuts off the steam before the full length is extruded, then energizes the knife to cut off the pipe, the automatic knife operating switch being rendered inoperative.

Manual unlocking of the former cap permits the operator to extrude plain tube lengths, leaving off the socket. In this mode of operation the cap is unlocked at the start of the operation so that the cap is free to be propelled by the extruded pipe away from the former die without forming the socket.

Another feature of this invention resides in a novel cutoff knife which is located within the former die and normally occupies a retracted position out of the path of the advancing column of clay issuing from the extrusion die. Upon rotation, the knife extends itself through the wall of the clay column to sever it just below the plane of the extrusion die. Since the presence of the former cap in the die will interfere with the cutoff knife, the electrical control system is arranged to prevent rotation and consequent extension of the knife unless the former cap is unlocked and shifted out of the former die.

Another aspect of the invention relates to the lubricant supply system and the arrangement of the spray nozzle which sprays it upon the surface of the former die and former cap. The cutoff knife is rotated by a vertical drive shaft extending downwardly through the extrusion die and the lubricant is passed through a bore which extends through the shaft to the cutoff knife. The mounting structure of the knife includes a spray head communicating with the bore; thus jet streams of atomized oil are emitted by the knife mounting structure. This simplifies the structure since the spray head does not interfere in any way with the cutoff knife.

The present invention is disclosed primarily in relation to coordinate operation of the press control valve, the former lock, the cut-off knife, and the lubricant spray apparatus all operated in sequence from a single control point. However, it is to be understood that the former lock, the cut-off knife, and the spray mechanism individually constitute important improvements in the art, by reason of which they may be utilized independently of one another in place of conventional apparatus now utilized to perform similar respective functions.

In the present disclosure, the main throttle valve is actuated by a hydraulic power cylinder which acts as a relay between the press lever and valve to reduce the effort needed to regulate the ram movements. This arrangement follows the disclosure of the copending application of Cecil E. Webb, for "Fluid Operated Control System," Serial No. 100,943, filed June 23, 1949, now Patent No. 2,646,778. The hydraulic system includes a pilot valve and hydraulic cylinder which causes the steam valve, to follow exactly the movements of the press lever but reducing the resistance to movement of the press lever. The operator is thus able to control the press faster and more accurately; moreover, the power relay control system complements the automatic apparatus as a contributing factor in the rapid production of the clay pipes.

The present apparatus embodies other structural features and advantages which can best be brought out in the following detailed description of the preferred embodiment of the invention as disclosed in the drawings.

In the drawings:

Figure 3 is a fragmentary view taken along the line

Figure 2:
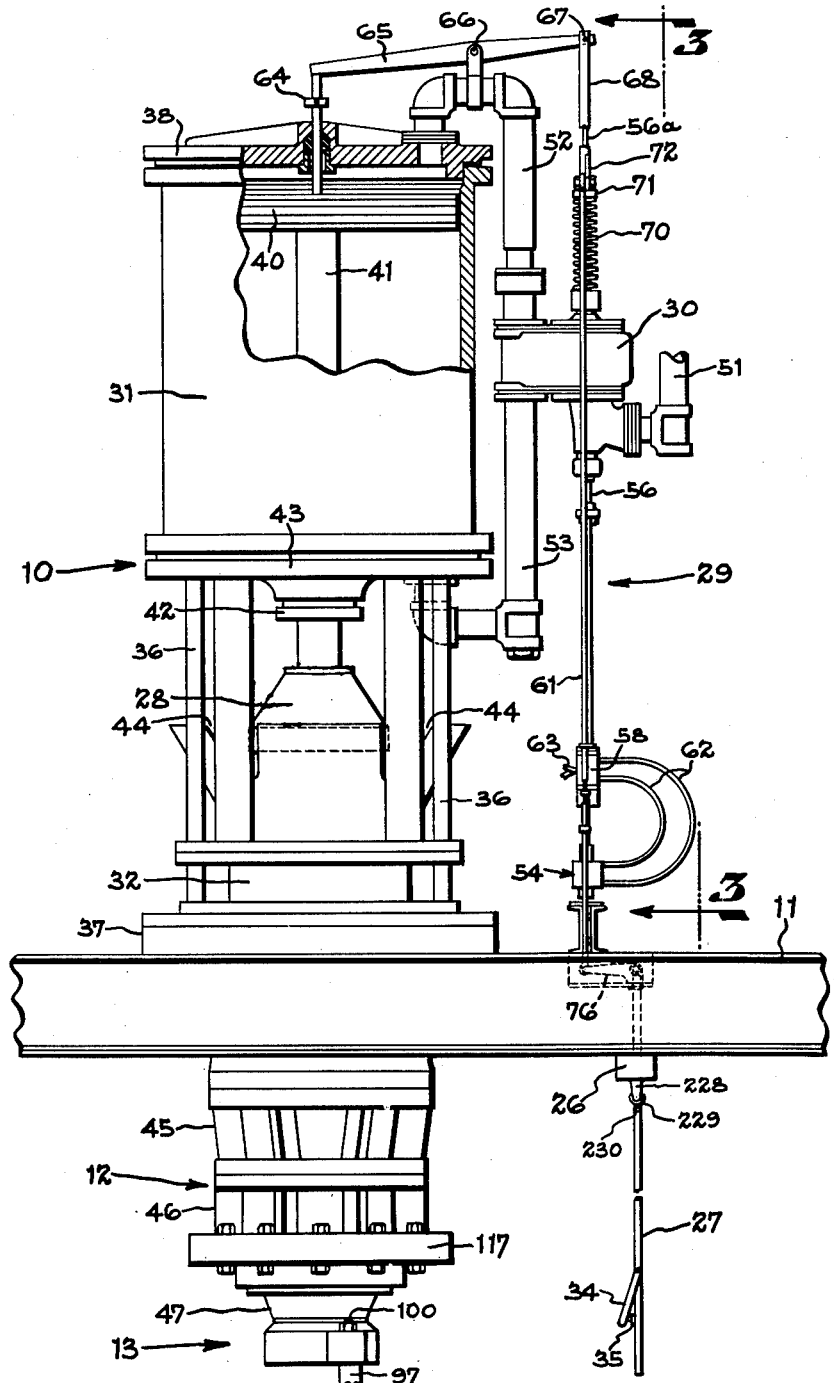
Figure 2 is an enlarged fragmentary view illustrating generally the steam cylinder, throttle valve and ram used in conjunction with the present apparatus.

3—3 of Figure 2, illustrating the hydraulic relay apparatus for transmitting the movements of the control lever by hydraulic pressure to the throttle valve of the steam press.

Figure 4 is a side view projected from Figure 3, further illustrating the hydraulic relay apparatus.

Figure 5 is an enlarged fragmentary side view illustrating the hydraulically operated former lock at the lower end of the extrusion die.

Figure 6 is a fragmentary view similar to Figure 5 as viewed from the side, further illustrating the locking mechanism of the former die with the cap in locked position.

Figure 7 is a diagrammatic view similar to Figure 6, showing the former lock in release position.

Figure 8 is a sectional view taken on line 8—8, Figure 6 further detailing the locking arrangement of the former cap.

Figure 9 is an enlarged fragmentary sectional view taken on line 9—9, Figure 5 showing the former cap locked in position with respect to the former die, with the socket portion of the sewer pipe expressed into the die.

Figure 10 is a view similar to Figure 9 showing the former cap released with the clay column extruded and with the cutoff knife in operation to sever the end of the column.

Figure 11 is a top plan view of the cutoff knife driving system as viewed along line 11—11, Figure 18.

Figure 12 is an enlarged fragmentary view taken from Figure 10, further detailing the cutoff knife.

Figure 13 is a sectional view taken on line 13—13, Figure 12, illustrating the lubricator jets as related to the cutoff knife.

Figure 14 is a bottom view taken on line 14—14, Figure 9, showing the cutoff knife in its retracted position.

Figure 15 is a view similar to Figure 14, showing the lateral movement of the cutoff knife with respect to the clay column as it swings from retracted to extended position at the cutoff cycle.

Figure 16 illustrates the cutoff knife in fully extended position and rotating with respect to the clay column.

Figure 17 illustrates the movements of the cutoff knife from extended to retracted position at the end of the cutoff cycle.

Figure 1:
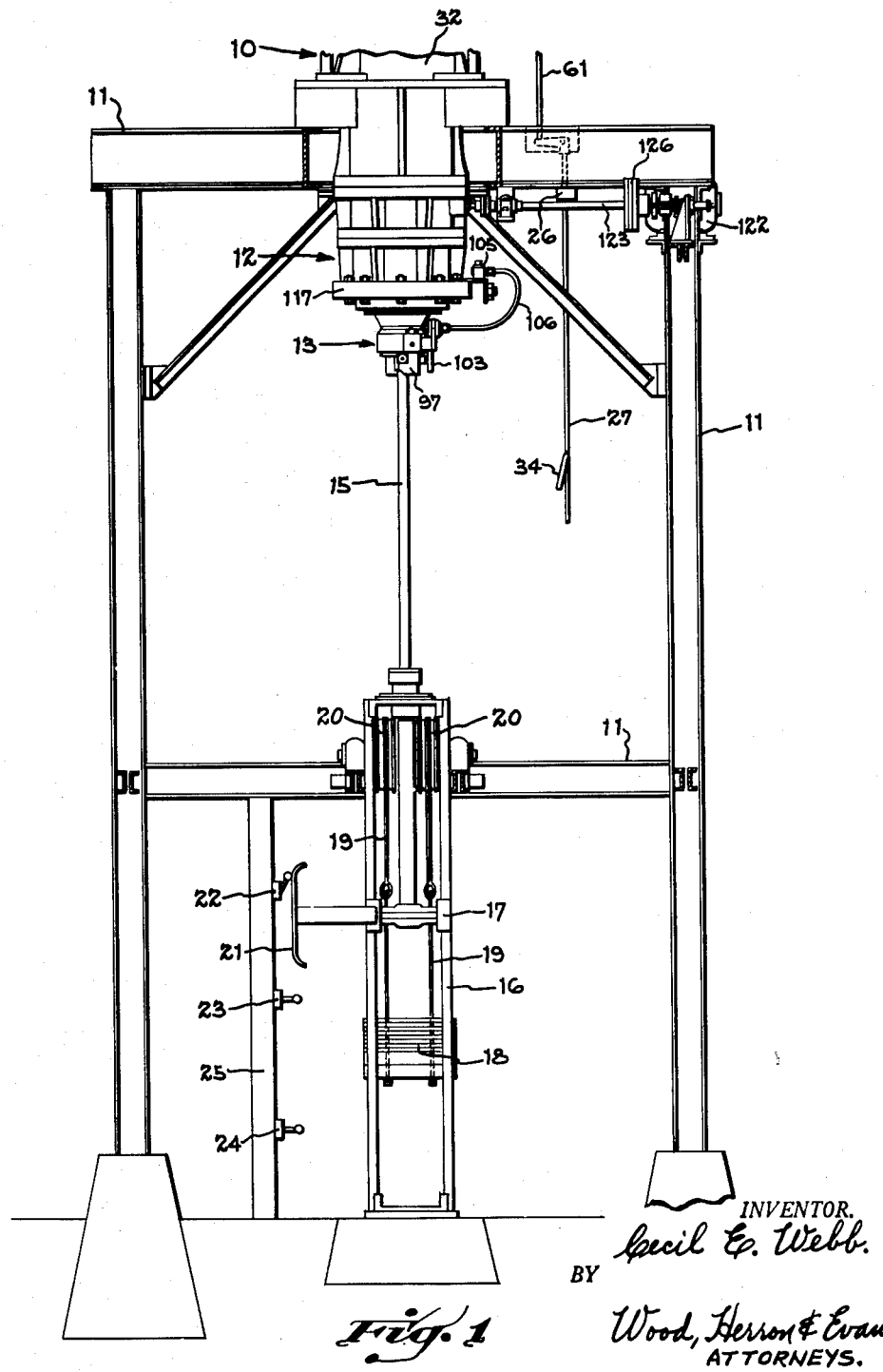
Figure 1 is a fragmentary side elevation illustrating the general arrangement of the present apparatus as applied to a steam extrusion press.

Figure 18 is an enlarged fragmentary sectional view taken from Figure 1, illustrating the driving system for the cutoff knife. In this view the cutoff knife is omitted in order to illustrate the arrangement utilized for the small diameter pipes which are manually broken off at the extrusion die; also, a modified lubricator nozzle is mounted in place of the cutoff knife shown in Figure 13.

Figure 19 is an enlarged fragmentary sectional view taken from Figure 18, illustrating a portion of the driving system for the cutoff knife and also the passageways for delivering lubricant to the former die and cap.

Figure 20 is an enlarged fragmentary view detailing the lubricating nozzle shown generally in Figure 18.

Figure 21 is a fragmentary view illustrating the crosshead utilizing photoelectric cells and related light sources in place of the trip switches illustrated in Figure 1.

Figure 22 is a sectional view taken along line 22—22 Figure 21, further detailing the crosshead arrangement.

Figure 23 is a diagrammatic view showing the former cap moving upwardly toward the former die and showing the application of the lubricant to the cap and die as the cap approaches its final locked position.

Figure 24 is a diagrammatic view similar to Figure 23, showing the former cap locked to the former die, with the press lever in extruding position for expressing the plastic clay into the former die to mold the socket end of the pipe.

Figure 25 is a similar diagrammatic view, showing the press lever shifted to charging position to relieve the pressure within the forming die and coincidentally to unlock the former cap to permit the cap to descend during the extrusion operation.

Figure 26 is a diagrammatic view illustrating the extrusion of the pipe after formation of the socket, showing the cap and its crosshead descending as the column is extruded.

Figure 27 is a diagrammatic view with the press lever shifted to neutral to stop the extrusion operation when the column length is extruded. This view illustrates the downward movement of the former cap and crosshead under momentum to trip the limit switch and cause operation of the cutoff knife, the knife being shown in its extended position.

Figure 28 is a diagram illustrating, in a simplified manner, an electrical circuit for controlling the automatic operation of the apparatus.

Figure 29:
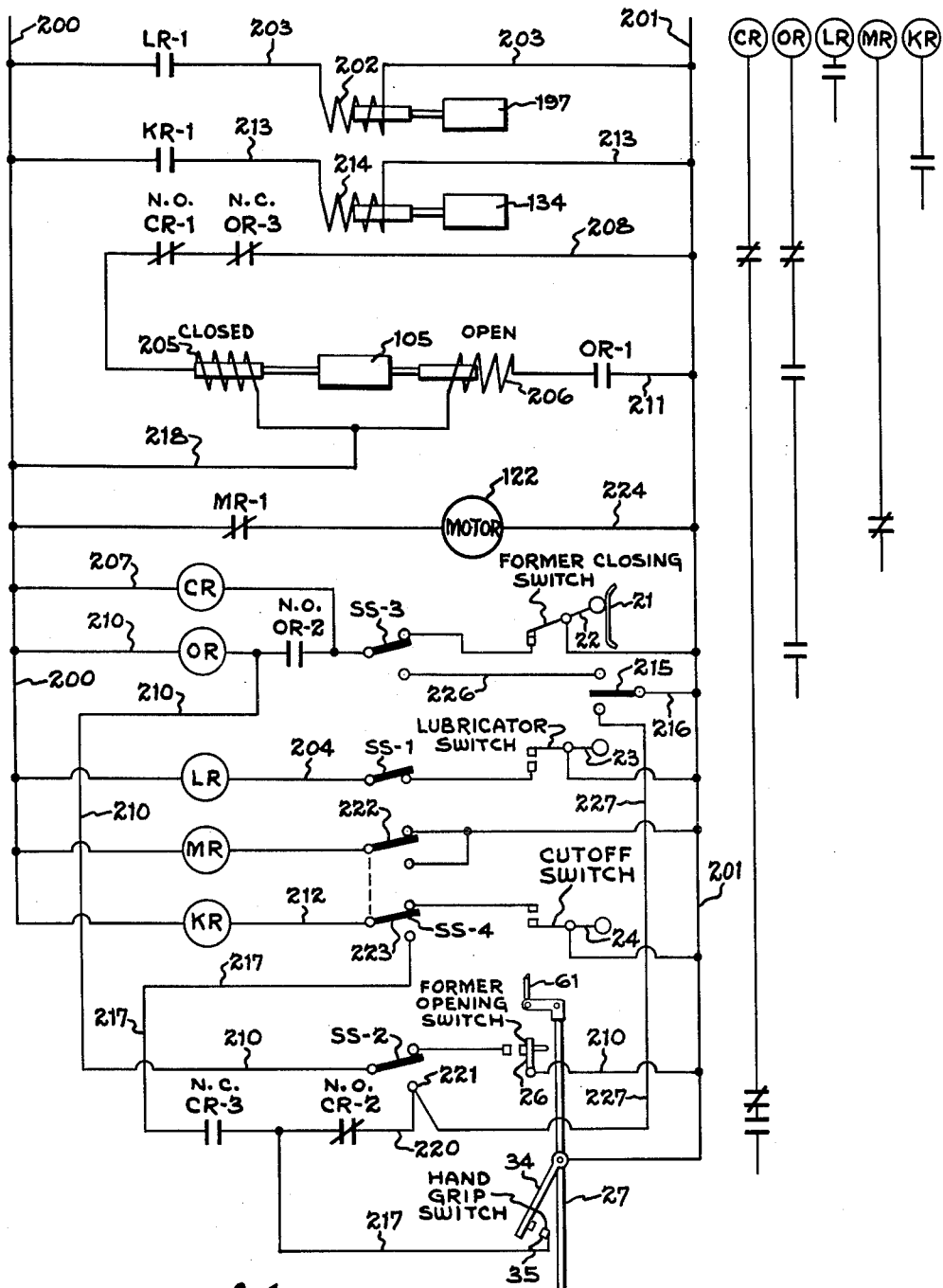

Figure 29 is a diagram illustrating the electrical circuit complete with selective control switches which enable the operator, at his option, to regulate certain operations manually.

Figure 30 is an enlarged fragmentary view of the press lever switch showing the tripping of the switch in response to movements of the press lever in pressure relief or charging direction.

Figure 31 is a fragmentary view illustrating a modified former locking mechanism which follows the operating principles of the structure shown in Figures 6 and 7.

*General arrangement and operation*

As best disclosed in Figures 1 and 2, the extrusion apparatus essentially consists of a vertical steam press indicated generally at 10, mounted upon a structural steel framework 11 and having an extrusion die 12 assembly extending downwardly from the lower portion of the press. The extrusion die forms the pipe column and includes at its lower end a former die 13 (Figure 9), which delineates the outside diameter of the pipe socket. The former cap 14 fits within the former die to delineate the inside diameter of the socket and is movable vertically with respect to the die.

As shown in Figure 1, the former cap is mounted upon the upper end of a vertical table rod 15 which is slidably supported in a vertical guide way 16 mounted beneath the die. The lower end of the table rod is secured to a cross head 17 slidably mounted in the guide way; a counterweight 18 includes cables 19 passing over pulleys 20 having their ends connected to the cross head. The counterweight is sufficiently heavy to bias the table rod and former cap in the upward direction. During the extrusion operation the descending clay column issuing from the extrusion die forces the cap downwardly as indicated in Figure 26. After the extruded pipe is removed, the counter weight returns the table rod and former cap back to the elevated position as indicated in Figure 23.

The crosshead 17 includes a switch actuating cam plate 21 which moves vertically with the crosshead to sequentially trip the control switches 22, 23 and 24 which are mounted upon the vertical post 25 forming a part of the structural framework 11. These switches are connected through an electrical control system to the hydraulic system to automatically lock the former cap when the cap reaches its elevated position shown in Figure 24, to operate the cutoff knife when the cap reaches the limit of downward travel as shown in Figure 27, and to actuate the lubricating apparatus just before the cap reaches its upper limit of movement as shown in Figure 23. The former lock is unlocked by switch 26 in response to movement of the press lever to release or charging position as shown in Figure 25 and also may be unlocked manually by a switch mounted on the press lever as described later.

As shown in Figure 2, the extrusion press includes a hand operated press lever 27 having three positions respectively for raising and lowering the extrusion ram 28, and a neutral position at which the ram is stationary.

In addition, the lever is movable to a fourth position slightly from neutral toward charging position to relieve steam pressure upon the ram.

This lever is connected to the hydraulic relay system indicated generally at 29 which in turn controls the main throttle valve 30 of the steam cylinder 31 by hydraulic pressure to provide quick and easy control. When the lever is in the extruding position, steam is admitted into the upper end of the cylinder 31 to force the ram downwardly causing the extrusion of clay. When the lever is shifted to relief position the ram is raised just sufficiently to relieve pressure within the former die to permit it to be unlocked. When the lever is moved to the charging position, steam is admitted into the lower end of the cylinder and the ram is elevated to allow additional clay to be introduced into the extrusion chamber 32 beneath the ram for expression through the extrusion die.

The hydraulic relay system is disclosed in detail in the copending application of Cecil E. Webb above noted, and its purpose is to actuate the steam valve by hydraulic pressure in response to the movements of the press lever 27. The arrangement is such that the valve is moved exactly according to the movement of the press lever 27, but without requiring the application of a great deal of force since the actual force is developed by hydraulic pressure. This allows the operator to manipulate the press lever quickly and precisely during each extrusion operation. Since the ultimate production capacity of the steam press depends primarily upon the speed of the press operator, the hydraulic relay system, in conjunction with the automatic apparatus, greatly increases the ultimate rate of production.

The cycles of operation in extruding successive sections of city pipe with the present apparatus are extremely rapid since the several operations required in each cycle are under the control of the press operator by manipulation of lever 27. Described briefly, the first step of the cycle is to mold the socket with the former cap locked in close position as shown in Figures 9 and 24. As shown, the control lever is shifted from the neutral position to the extruding position, causing the ram to descend in the extrusion chamber 32 to force clay into the closed die. When the die is completely filled the excess clay begins to issue from the crevices of the die as a ragged fringe 33 (Figures 9 and 25), thus indicating to the operator that the socket is formed.

The operator then shifts the press lever to the relief position shown in Figure 25, causing the ram immediately to relieve the pressure in the forming die so that the former cap may be unlocked. The cap is unlocked as shown in Figure 25 by engagement of the press lever 27 in relief position with the switch 26 as shown, or optionally by squeezing the handle 34 which is mounted upon the swinging end of the press lever (Figure 2). Handle 34 actuates a switch 35 and either switch 26 or 35 is effective to apply fluid pressure to a hydraulic cylinder which in turn unlocks the cap by rotary movement as described later. After the cap is unlocked, the press lever is again shifted to extruding position as shown in Figure 26, causing the column portion of the pipe to be extruded, the cap being pushed downwardly counter to the bias of the counterweight during this operation.

The length of the column is under control of the operator and when the desired length is extruded, the press lever is swung back to neutral position as shown in Figure 27. The extruding operation is extremely rapid and the momentum caused by the rapidly extruded column as it issues is sufficient to cause the former cap and associated machanism to continue moving downwardly until the lower switch 24 is tripped as shown in Figure 27. Tripping of this switch causes the cutoff knife to be rotated suddenly and extended, thus severing the extruded column. At or about the same time, with the press lever at neutral, the extruded pipe is gripped by one or a group of helpers, depending upon the size and weight of the pipe, so that upon operation of the cutoff knife these men transfer the severed pipe from the extruder for further operations.

As the pipe is removed, the counterweight returns the former cap and associated mechanism upwardly, causing switch 23 to be tripped as shown in Figure 23, at which point the lubricating apparatus becomes effective to spray atomized lubricant upon the former die and cap. When the cap strikes the former die in its upward travel it trips switch 22 causing the cap to be locked to the die as shown in Figure 24. The apparatus is then ready for the beginning of the next cycle of operation.

The operations during each cycle occur in very rapid sequence and being fully automatic in response to actuation of the press lever and movements of the former cap, the extruded pipes are produced at a very rapid rate. The detailed structure and operation of the various components of the apparatus are described in detail under appropriate headings in this specification.

*Hydraulic relay system*

As above pointed out, the extrusion machine illustrating a preferred embodiment of the invention has been used for many years in the sewer pipe industry. A general description of its structure and operation will be helpful in more clearly understanding the structure and operation of the automatic apparatus. As best disclosed in Figure 2, the steam cylinder 31 is secured by vertical tie bolts 36 rising from a base 37 which is secured upon the horizontal beams of the framework 11. The cylinder includes a top cylinder head 38 and a piston 40 having a piston rod 41 passing through a packing gland 42 forming a part of the lower head 43. The lower end of the piston rod carries the extrusion ram 28 which traverses the extrusion chamber 32.

In the position shown, the ram 28 is elevated to charging position, the plastic clay being fed into the extrusion chamber 32 by way of the tapered upper portion 44 of the chamber. The machine is equipped with mechanical means for feeding the clay into the chamber (not shown) when the ram is elevated.

It will be noted in Figure 18 that the extrusion die assembly 12 consists of three cylindrical sections, 45, 46, and 47 bolted together and extending downwardly from the base 37, the base having a cylindrical bore 48 in communication with the extrusion chamber. The structural details of the die assembly are described in the following section in conjunction with the former die.

When the ram is lowered upon the plastic clay, the clay is confined within the extrusion chamber beneath the descending ram and is forced downwardly under extremely high pressure through the cylindrical bore 48 and cylindrical sections to the extrusion die. The extrusion die forms the outside diameter of the clay column and the inside diameter is formed by the internal mandrel 50, as shown in Figure 18.

The piston and ram movements are controlled by the reversing steam throttle valve 30 previously noted, the valve being of conventional design to provide neutral and forward and reverse piston movements. A supply pipe 51 conducts steam pressure to the valve and the pipes 52 and 53 transmit the steam from the valve to the upper and lower ends of the cylinder in response to movements of the valve. An exhaust line (not shown) extends from the valve to conduct the exhaust steam from one end of the cylinder when steam pressure is applied to the other end.

In the past the valve 30 was controlled by direct connection with the press lever 27. However, the machines are quite massive and the valve offers considerable resistance to movement because of steam pressure and friction between moving parts. During the extrusion operation the valve is actuated almost continuously in order to control the extrusion speed and to stop and reverse the piston at the required stages of operation. The hydraulic relay system 29 of the copending application makes the valve operation almost effortless and by so doing, greatly increases the speed and accuracy of press operation.

Described generally, with reference to Figures 2, 3 and 4, the hydraulic relay apparatus includes a hydraulic cylinder assembly 54 mounted upon the framework 11 and having a piston rod 55 connected to the steam valve stem 56 by means of a valve actuating rod 57. Application of hydraulic pressure to the upper or lower end of cylinder 54 transmits upward or downward movement to the steam valve stem 56. Admission of the hydraulic pressure to cylinder 54 is controlled by a hydraulic pilot valve 58 which is mounted upon the actuating rod 57. The pilot valve includes a valve plunger 60 operatively connected to a control rod 61 which is connected for vertical movement to the press lever 27.

Hydraulic pilot valve 58 consists of a reversing valve having a neutral and a forward and reverse position corresponding to the positions of the steam valve and is connected by the flexible conduits 62—62 to the hydraulic cylinder 54. Pressure and exhaust conduits 63—63 connect the pilot valve to a hydraulic supply system (not shown) to supply hydraulic fluid pressure to the cylinder under control of the pilot valve.

Movement of the press lever is transmitted to control rod 61 and to valve plunger 60, shifting the plunger relative to the casing and causing hydraulic pressure to be transmitted from the pilot valve to the hydraulic cylinder 54. The hydraulic cylinder moves the actuating rod 57 in the same direction as control rod 61 and since the casing of valve 58 is mounted on rod 57, the casing will shift relative to the valve plunger in a direction to reestablish the neutral position. The response is almost immediate the direction and extent of movement is equal to that of control rod 61 thereby reproducing the movements of the press lever and control rod in the steam valve.

A safety interlock is provided in conjunction with the hydraulic relay system in order to prevent the steam piston from rising above its upper stroke limit. For this purpose there is provided a plunger 64 (Figure 2) passing through the top cylinder head for engagement by the piston. The outer end of the plunger is engaged against the end of a lever 65. Lever 65 is pivoted as at 66 and has its opposite end pivoted as at 67 to a tube 68. The tube is slidably mounted upon the portion 56a of the valve stem 56 which extends through the valve and rises upwardly above it. A compression spring 70 is mounted in compression between the top of the steam valve and a collar 71, secured on the lower end of tube 68; the spring maintains the tube normally in the position shown in Figure 2. Also secured upon the lower end of tube 68 is an arm 72 extending laterally and having its outer end connected to the upper section 61a of control rod 61 (Figure 3). The lower end of section 61a is slidably connected to the control rod 61 by a stud 73.

When the steam piston reaches its upper limit of movement and engages plunger 64, the movement will be transmitted by way of lever 65 to tube 68, causing the tube to compress spring 70. Downward movement of the tube is transmitted by way of arm 72 to the upper control rod section 61a, causing its lower end to contact the collar 74 of stud 73 and thereby lower the plunger 60 of the pilot valve. The pilot valve will then be effective to actuate the hydraulic cylinder in a direction to lower the steam valve stem and thus cause a corresponding downward movement of the steam piston until the interlock plunger 64 moves back to the position shown in Figure 2.

The connection between the press lever and control rod 61 is made yieldable so that the downward safety interlock movement of the control rod is not transmitted to the press lever, thereby protecting the operator. As shown in Figure 4, this connection consists of an eye bolt 75 pivotally connected to the end of the press lever arm 76 and having a shank 77 extending into the tubular control rod 61. A preloaded compression spring (not shown) is interposed between the end of the shank and a cross pin 78 passing through the tubular rod. The lower end of the tube is slotted as at 80, the slot being engaged by a cross pin 81 passing through the shank of the eye bolt. When the safety device goes into action, the rod section 61 is depressed against the compression spring so that the motion is not transmitted to the press lever.

The press lever is normally held in neutral position by an arm 82 engaging a detent plate 83, which swings with the press lever (Figure 4). A tension spring 84 is connected to the arm to bias it toward the detent plate. Movement of the press lever from neutral expands the spring and upon release of the press lever, the spring is effective to swing it back to the neutral position.

*Former die and locking mechanism*

As shown in Figure 18, the former die 13 is an integral part of the cylindrical section 47. Section 47 is fastened to the cylindrical collar 46 by bolts 85. The section 47 is generally funnel shaped and is of two-piece construction consisting of an upper section 86 and a lower section 87 fastened together by the bolts 88. The mandrel 50 is disposed concentrically within the restricted throat 90 of the die; thus the mandrel delineates the inside diameter of the clay column and the throat delineates the outside diameter (Figure 10).

The former die 13 extends downwardly from the throat 90 as an integral part of the lower die section 87. It is to be observed at this point that the sectional construction of the extrusion die permits various sizes of dies to be installed interchangeably to provide various pipe diameters, corresponding mandrels being installed with the dies to provide the inside diameters. It will also be understood that the diameter of the former die 13 will vary with the pipe diameters and that former caps 14 of suitable size are installed for the various socket diameters.

The outside diameter of the socket is molded by the insert ring 91 which fits within the former die, being secured in place by screws 92 (Figure 18).

As previously explained, the cap is locked to the former die to resist the pressure of the extruded clay during formation of the socket; after the socket is formed, the cap is unlocked and moves downwardly, being propelled by the extruded column of clay issuing from the die. The cap 14 is mounted upon the upper end of the table rod 15 (Figure 1) as previously outlined, the rod being biased upwardly by the counterweight 18 to urge the rod and former cap normally toward the former die. When the extrusion is complete and the pipe removed, the cap is returned automatically to its position within the former die under the influence of the counterweight.

The extrusion press and former die arrangement so far described is conventional and has been used in the industry for a great many years as a hand controlled machine. Under manual operation, a hand operated former lock is mounted upon the former die to lock the cap to the die in the position shown in Figures 6 and 9 at the start of each extrusion cycle. For this purpose the helper was stationed at the former die to operate the lock in response to the signals of the operator controlling the press lever 27. At the end of an extrusion operation, one or more workmen remove the extruded pipe thus allowing the cap to return to the die under influence of the counterweight.

Described very briefly, manual press operation consists of the steps of locking the cap, extruding the socket, reversing the press, unlocking the cap, then extruding the complete pipe. In addition, lubricant is applied manually to the cap and die before they are closed and locked. The fact that the lock operations and press operations are dependent upon one another makes close coordination between the press operator and the lock operator necessary for efficient production.

The present automatic apparatus centralizes the control of all the operations in the press operator himself and thus provides more accurate control of the cycles so as to improve the quality of the product. The movements of the press lever under automatic operation are the same as under manual operation; therefore, automatic operation requires no additional skill or effort on the part of the operator. Production efficiency is further increased by the provision of the automatic cutoff mechanism for severing the completed pipes since this mechanism eliminates bending them. The automatic lubricating equipment which applies lubricant to the former cap and die upon each cycle of operation eliminates damage to the sockets in stripping them from the die. The structure and operation of the cutoff and lubricating equipment will be described later.

Several different types of former cap locking arrangements are contemplated in order to accommodate the apparatus to the various conventional types of former dies. In each instance the locking movement is developed by a hydraulic cylinder so that the apparatus can be adapted to the various types of dies simply by applying an appropriate locking mechanism.

The former lock disclosed in Figures 5 to 8 inclusive represents a conventional structure having added to it a hydraulically operated mechanism for locking and unlocking the cap. The former cap 14, as indicated in Figure 9, basically consists of two major parts, a spider 93 and the former cap 14, both being secured together and rotatably mounted upon the upper end of the table rod. The spider is disposed immediately beneath the former cap and in the present example includes two rotatable locking arms 94—94 and an actuating arm 95 (Figures 5 to 8). Upon the outer ends of the locking arms, respective locking rollers 96—96 are pivotally mounted and adapted to engage the locking hooks 97—97 which are suspended from the exterior of the die. For this purpose, the former die 3 includes lugs 98—98 traversed by the shanks 100 of the hooks and anchored by nuts 101.

The actuating arm 95 is provided with a roller 102 adapted to be engaged by the locking yoke 103. Yoke 103 is shifted by means of the hydraulic cylinder 104 and when the roller 102 is engaged therein, rocking movements of the yoke are transmitted to the spider causing a partial revolution sufficient to engage or disengage the rollers 96 with respect to the hooks 97. Hydraulic fluid is supplied to the opposite ends of cylinder 104 by means of the electrically operated reversing valve 105 which is connected by way of the conduits 106—106 to the cylinder. Hydraulic fluid pressure is supplied to the valve by the conduits 107 and 108 which lead to the supply system. The operation of valve 105 is described in detail later in this specification.

When the locking yoke is shifted to the position shown in Figure 7, the locking rollers are shifted out of engagement with respect to the hooks allowing the former cap to be moved downwardly by the extrusion as it issues from the die. Upon removal of the extruded pipe, the former cap is returned by the counter weight to the forming die with the yoke in the vertical position shown in Figure 7 so that the actuating roller will enter the open end of the yoke. The hydraulic fluid is then admitted to the cylinder 104 causing the yoke to be rocked to the position shown in Figure 6, thereby rotating the spider to a position with the locking rollers engaged within the hooks 97 as shown in Figure 5.

As shown in this view, the cylinder is pivotally mounted as at 110 upon a block 111 which is secured to the forming die. The piston rod 112 is pivotally mounted as at 113 to the upper end of the yoke. The yoke is pivotally mounted as at 114 upon the opposite end of block 111, a spacer 115 being interposed between the block 111 and body of the die to locate the yoke in alignment with the actuating roller 102.

The valve 105 is a conventional electrically operated unit arranged to actuate cylinder 104 in response to the electrical control circuit. Since the valve is well known in the art, a detailed description of its construction and operation has been omitted. The valve is indicated diagrammatically in the electrical circuit illustrated in Figure 28 and its operation will be more completely understood in the description with reference to the diagram.

As shown in Figure 5, valve 105 is mounted upon a bracket 116 which is secured to the flange 117 of the former die. In normal operation the former lock is unlocked by operation of switch 26 when the press lever 27 is moved to charging position, or it may be unlocked by the manually operated switch 35 which is mounted upon the lower end of the lever if desired.

Upon being unlocked, the yoke is shifted to the vertical position shown in Figure 7 which allows the former cap and table rod to descend. When the finished pipe is removed and the former cap moves back to the former die, the actuating roller 102 re-enters the open end of the yoke. At this time the cam plate 21 engages switch 22 as shown in Figure 1, causing the hydraulic cylinder to shift the yoke to locking position as shown in Figure 6; the apparatus is then in condition for the next operation. As shown in Figure 9, the table rod 15, which is locked against rotation by the cross head 17, includes a pair of stop pins 118—118 engaged by pin 119 of the spider 93 to align the roller 102 with the yoke.

Cutoff mechanism

The cutoff mechanism is mounted within the former die just beneath the extrusion die as indicated generally at 120 in Figure 9. In general the mechanism consists of a rotatable knife which is mounted for rotation upon the central axis of the mandrel 50, the knife being normally retracted in a position clear of the diameter of the pipe column so as not to interfere with the extruding operation. Upon being rotated, the knife moves to the extended position shown in Figures 16 and 27 and during rotation severs the extruded column then returns to its retracted position upon being stopped.

The rotation of the cutoff knife is controlled automatically by the switch 24 which is tripped by the cam plate 21 when the table rod reaches the limit of downward travel as shown diagrammatically in Figure 27.

It is to be noted at this point that the actual length of the extruded pipe is controlled by the press operator by moving the control lever to the neutral position to stop the extruder ram when the required length is extruded. However, the extrusion issues from the die at a rapid rate and momentum is sufficient to cause the former cap and table rod to continue downwardly until the switch 24 is tripped as shown in Figure 27. The workmen remove the pipe as soon as the cutoff operation is performed so that the cap is free to move immediately back to the former die for the next cycle.

It will be observed that the cutoff knife nests within the upper portion of the former cap, the cap having an opening 121 (Figure 9) for this purpose. It is necessary therefore that the cutoff knife be stopped and retracted before the cap moves up to the die.

Described generally with reference to Figures 1, 11 and 18, the cutoff knife is rotated by the motor 122 mounted upon the frame 11 and having a drive shaft 123 extending to the extrusion die for rotating the knife. The frame is provided with a mounting structure 124, arranged to support the motor in spaced relationship to a commercial clutch-brake unit indicated generally at 125 which controls the intermittent rotation of the drive shaft and cutoff knife. In the present disclosure, the motor is connected to the clutch-brake unit by means of the V belts 126 passing over the motor pulley 127 to the driven pulley 128. In another arrangement (not shown) the motor is coupled directly to the clutch-brake unit. In order to permit the speed of rotation of the cutoff knife to be changed in accordance to the diameter of the pipe, the motor includes speed change gears which may be shifted to provide the necessary speeds.

The clutch-brake unit 125 comprises a clutch 130 and a brake 131 on opposite sides of a yoke 132, so arranged that in one position the clutch is engaged to rotate shaft 123 and cutoff knife and in the second position, the brake 131 is applied to stop abruptly rotation of the shaft and knife. As later described, the cutoff knife is moved to its extended position by inertia, the clutch being engaged suddenly to impart a sudden start to the driving system of the knife. Sudden application of the brake brings the drive to a sudden stop, causing the knife to be shifted to its retracted position. In order to provide sudden starts, the motor 122 is energized, continuously while the apparatus is in operation as described later.

As shown in Figures 11 and 18, the shifter 135 for the clutch-brake is controlled preferably by an air cylinder 133 and the admission of air pressure to the cylinder is controlled by an electrically operated valve 134 of commercial design which is shifted in response to operation of the switch 24. The air valve cylinder 133 can also be actuated by operating the hand grip switch 35 for manual regulation as described later. The clutch-brake unit 125 is also of conventional design and therefore is not disclosed in detail.

Shifter 135 engages the yoke 132 which is interposed between the clutch and brake, the shifter being connected by a link 136 to the piston rod 137 of the cylinder. Except when the knife is rotating, air pressure is supplied constantly to the cylinder to draw the piston rod inwardly. The shifter is pivoted as at 138, and thus will normally draw the yoke element 132 into engagement with the brake 131, with the clutch 130 disengaged. Upon application of air pressure to the opposite end of the cylinder, the piston rod will move outwardly thus shifting the yoke element 132 out of engagement with the brake and causing sudden engagement of the clutch to drive the cutoff knife.

The drive from the clutch-brake to the cutoff knife is best shown in Figure 18. As shown, the inner end of drive shaft 123 adjacent the clutch-brake is supported in a bearing 140 mounted on the bracket 141 and the outer end is journalled in the bearing 142. The stationary element of the brake is held against rotation by an arm 143 extending from bracket 141 and engaging a yoke 144. The yoke forms a part of the brake element (Figure 11); thus the turning force of the shaft 123 is transmitted from the yoke to the fixed arm when the brake is engaged.

A shaft section 145 passes through the upper cylindrical section 45 of the extrusion die and is connected to shaft 123 by a coupler 146. Shaft section 145 is journalled in ball bearings 147—147 secured within the die section. A vertical shaft 148 extends downwardly through a central bore formed within the mandrel 50 and is journalled in a ball bearing 150 at its upper end and in a bushing 151 at its lower end. Shaft 145 is in driving connection with shaft 148 by the bevel gears 152 and 153 mounted upon the adjacent ends of the shafts as detailed in Figure 19.

It will be noted in Figures 18 and 19 that the air and lubricant mixture for the former cap and die is conducted to the lower end of the die by way of the vertical shaft 148 which is provided for this purpose with a longitudinal bore 154. The lubricant is supplied to the bore by way of the conduit 155 extending from a commercial lubricant supply unit (not shown), the mounting bracket 156 of the mandrel having a passageway 157 for the lubricant. The upper end of the mandrel has an annular groove 158 to provide a continuation of passageway 157 and radial passageways 160 extend inwardly from groove 158 to the enlarged counterbore 161 (Figure 19). Packing rings 162 and 163 are maintained in position by the compression spring 164 to prevent the lubricant from escaping through the bearing 150 or from passing downwardly about the exterior of shaft 148. The lubricant bore 154 communicates with a distributing nozzle arranged to spray the lubricant upon the former die and the former cap, as described later. The upper end of bore 154 is connected to bore 161 by a radial passageway 165.

The structure and operation of the cutoff knife assembly is shown most clearly in Figures 12 to 17. As shown, the cutoff knife assembly 120 is mounted for rotation upon the lower end of shaft 148 by a collar 166 which is threaded upon the end of the shaft. The collar is bored to receive the stub shaft 167 of the cutoff knife assembly, the shaft being fixed with respect to the collar by set screws 168—168.

Collar 166 is interchangeable with the lubricator nozzle 170 shown in Figures 18 and 20. The nozzle is installed in place of the cutoff knife in producing small diameter pipes which are broken off manually instead of being severed.

The present cutoff knife assembly is advanced and retracted by the rapid starting and stopping of shaft 148 upon operation of the brake and clutch 131 and 130 as described above. For this purpose a mounting ring 171 is rotatably mounted upon the stub shaft 167 as detailed in Figure 13. The mounting plate is journalled loosely upon a bushing 172 and is held against endwise movement by an end plate 173 forming a part of stub shaft 167. It is to be noted at this point that stub shaft 167 includes a bore 174 communicating with the bore 154 of shaft 148 to convey the atomized lubricant to the outlet jets 175 which are drilled at an angle through plate 173 to bore 174. The outlet jets are arranged to spray the lubricant both upon the internal surface of the former die and upon the former cap as the cap advances toward the die.

The cutoff knife blade 176 is mounted in an arm 177 pivotally mounted as at 178 (Figure 14) at the lower side of ring 171. The arm includes a gear sector 180 having teeth 181 meshing with pins 182 projecting downwardly from plate 173. Bearing in mind that mounting ring 171 is free to rotate with respect to stub shaft 167, it will be apparent that sudden rotation of the stub shaft and the pins 182 in the direction indicated in Figure 15 will have a tendency to swing the arm 177 outwardly due to the inertia of the mounting plate and arm.

As the arm swings outwardly, the knife blade 176 at its outer end will contact the wall of the pipe as shown in Figure 15 causing the end of the knife to penetrate the wall of the clay column. This resistance to rotation causes the arm to swing to the fully extended position shown in Figure 16, with the heel portion 183 of the arm engaged against the stop pin 184 which is anchored in the mounting ring 171. In this position the arm is rigidly locked against further extension and the mounting ring assembly is driven in the same direction as the stub shaft by engagement of the pin 182 with the gear sector. The cutoff knife executes several revolutions in this position to completely sever the clay column, then the brake 131 is applied, bringing the shaft 148 to a quick stop.

When this occurs, the energy stored in the mounting ring and arm causes these parts to continue rotating in the same direction after the stub shaft has stopped. Due to the meshing of pins 182 with the gear segment 180, the relative rotation of the mounting ring and arm with respect to the stationary pins causes the arm to pivot in the retracting direction as indicated in the arrows of Figure 17, finally coming to rest in the position shown in Figure 14 with the arm and knife fully retracted within the confines of the mounting ring 171.

A torsion spring 185 (Figure 12) is arranged to maintain the knife normally in the retracted position shown. Spring 185 has its upper end anchored as at 186 upon the stub shaft and has its lower end anchored as at 187 upon the hub 188 of the mounting ring. The spring is arranged to urge the mounting ring normally in retracting direction to poise the knife as shown in Figure 14. In other words, relative rotation between the stub shaft and mounting ring incident to extending the knife is resisted by the spring, the rotation being counter to the spring torque. When shaft rotation is stopped, the energy stored in the spring aids in rotating the mounting ring to the retracting position. The residual torque of the spring biases the ring constantly in retracting direction so that there is no danger in having the knife accidentally extend into the wall of the column during extrusion or of having it struck by the former cap when the cap enters the die.

In order to provide an efficient cutting action, the cut-off knife 176 is arranged to feather with respect to the wall of the clay column as it advances through it during the cutting operation. For this purpose the knife is mounted upon a shaft 190 loosely journalled in the arm 177 (Figure 16). The shaft includes a groove 191 engaged by a pin 192 to prevent endwise displacement of the shaft. The outer end of shaft 190 includes a head 193, the knife being mounted upon the head with the major portion of its width offset with respect to the axis of the shaft so that the knife trails the axis of the shaft. By this arrangement the knife will automatically align itself as it advances through the wall of the pipe; moreover the feathering action prevents damage to the knife.

As noted above the motor for driving the knife runs continuously and when switch 24 is tripped, the electrically operated air valve 134 is shifted in a direction to supply air pressure to cylinder 133 which in turn, engages clutch 130, causing sudden rotation of the driving system leading to the cutoff knife. The cam plate 21 holds the switch in tripped position only momentarily while the former cap and cam plate reaches the limit of downward movement and begins to move upwardly. As soon as the plate moves out of engagement with the switch, the electrically operated valve releases the air pressure from cylinder 133, causing the brake 131 to be applied. This immediately stops the rotation of the cutoff knife and the flywheel effect causes it to retract. However, the interval is sufficiently long to permit the knife to complete several revolutions so as to completely sever the pipe before being retracted.

Lubricating system

The lubricant is supplied to the conduit 155 in the form of an atomized mixture of oil and air from a commercial system indicated diagrammatically in Figure 28. In general the system consists of a mixing tank indicated at 195 containing lubricant and connected to a source of compressed air by way of the compressed air supply conduit 196. The mixture of air and lubricant is conducted from the tank by way of the conduit 155 and passageways previously described which extend to the spray jets or nozzle in the former die.

The electrically operated lubricator valve 197 is inserted in the conduit 196. Valve 197 is normally closed and the tank is arranged to mix the air and lubricant when the valve is open and to spray the mixture from the jets upon the former die and cap. The conduit 155 preferably is provided with a trap indicated diagrammatically at 198 arranged to collect water and dirt which may be entrained in the air stream and allows the water to be drained from the system.

The electrically operated lubricator valve 197 is in electrical connection with the lubricator switch 23 and this switch is tripped momentarily by upward movement of the cam plate 21 to produce a spurt of atomized lubricant as the cap approaches the die as indicated in Figure 23. This produces an oil fog in the area of the cap and die so that a film is deposited on both parts. The electrical circuit for controlling the lubricator valve is described in greater detail with reference to the electrical control circuit illustrated in Figure 28.

The primary purpose of applying the lubricant to the surface of the former die and former cap is to interpose an oil film which prevents the plastic clay, which is extruded under high pressure into the former die, from sticking to the die surfaces. This allows the socket to be stripped cleanly from the dies when the former cap is unlocked and the extruded pipe removed. Since most of the lubricant film adheres to the socket it is necessary to apply a fresh film upon each extrusion operation. Under hand operation of the press, the lubricant was applied by hand and a certain percentage of the pipes were lost because the sockets were damaged when stripped from the former cap or die. The present mode of applying it is far more effective and increases the quality of the pipes and substantially eliminates damage to them. The application of the lubricant from above in the form of a mist or fog has the additional advantage of keeping the working parts of the former cap locking mechanism well lubricated to assure smooth positive operation and to eliminate unnecessary wear.

Control system and operation

The several movements executed by the press lever and former cap during an extrusion cycle of operation as illustrated diagrammatically in Figures 23 to 27, operate the former lock, cutoff knife, and lubricator automatically by way of the electrical circuit disclosed in Figures 28 and 29. Figure 28 is a simplified diagram which illustrates only the essential components of the circuit which are employed when the apparatus is operated automatically. Figure 29 illustrates the same circuit but includes the additional manually operated switches and interlocks by means of which certain operations may be performed manually if desired.

The automatic cycle of operation essentially consists of first locking the former cap to its die, molding the socket, relieving the extrusion pressure, unlocking the cap, extruding the column, and cutting off the extruded pipe. After the pipe is severed and removed, the former cap moves back automatically to its elevated position and just before it reaches the former die, the lubricant is sprayed upon it as indicated in Figure 23.

Upon striking the former die, the locking roller 102 enters the open end of the yoke 103 (Figure 7) and the yoke is then shifted to the position shown in Figure 6 to rotate the spider 93 to locked position. This operation is executed either automatically by operation of switch 26 (Figure 24) or manually by actuating the hand grip switch 35 on the press lever 27.

In the simplified circuit as disclosed in Figure 28, the main power lines are indicated at 200 and 201 and the control relays and their contacts are shown in separate lines extending across the power lines. The various contacts are associated with their relays in the line diagram along the right hand side of the circuit.

The electrically operated valve 197 of the air supply conduit 196 has its winding 202 connected in the line 203 which is controlled by the contact LR–1. When contact LR–1 closes, the lubricator valve opens to supply lubricant to the former cap and die. This contact is actuated by the lubricator relay LR interposed in line 204, the relay being energized by the lubricator switch 23. Switch 23 is arranged to trip only during the upward movement of the cam plate 21 thereby closing the switch momentarily to energize relay LR to spray the lubricant when the former cap is in the position shown in Figure 23. Since the switch 23 is unidirectional the lubricant system is ineffective upon downward movement of the cam plate.

The former cap is closed and opened by the electrically operated hydraulic former lock valve 105 which includes the closing winding 205 and the opening winding 206. These windings are energized alternately and are arranged to apply hydraulic pressure to the respective ends of the hydraulic cylinder 104 which locks and unlocks the former cap. The hydraulic valve 105 essentially is a reversing valve arranged to apply pressure to one end of the cylinder and exhaust the opposite end by way of the conduits 106—106 as previously explained. When the former cap strikes the former die as shown in Figure 24, cam plate 21 trips switch 22 which is interposed in line 207 to energize the closing relay CR. When the closing relay CR is energized, it closes contact CR-1, line 208 which in turn, energizes the closing winding 205 as shown. When winding 205 is energized, the yoke 103 is shifted to the position shown in Figure 6 to lock the former cap to the die.

When the cap is locked, the operator moves press lever 27 to extruding position (Figure 24) to form the socket and when the ragged clay fringe 33 appears, the lever is shifted to the relief position (Figure 25) to relieve the steam pressure on the ram. Upon being shifted to relief position, the lever momentarily closes the form opening switch 26 in line 210 thus energizing the opening relay OR. This in turn closes contact OR-1 in line 211 thus completing the circuit to the opening winding 206. The opening winding shifts control valve 105 to a position to admit fluid pressure to the opposite end of cylinder 104 thereby shifting the yoke to the unlocking position shown in Figure 7.

As soon as the cap is unlocked, the operator shifts the press lever to the extruding position shown in Figure 26, causing the clay column to issue from the die and propel the former cap downwardly. When the required column length is extruded, the press lever is shifted to neutral position (Figure 27) cutting off the steam while the cap, table rod and cam plate continue to move downwardly under momentum to trip the cutoff switch 24. It is to be noted that this switch, unlike the other two, is tripped to closed position only during downward movement of the cam plate.

The cutoff switch is interconnected in line 212 and is arranged to energize the cutoff relay KR so as to close momentarily contact KR-1 in line 213. The clutch-brake unit 125, which regulates the cutoff knife, is controlled by the air cylinder 133 and admission of air is regulated by the electrically operated air valve 134 having its winding 214 in line 213. The arrangement is such that the clutch is engaged when air is admitted to the one end of cylinder 133 and to engage the brake when air is admitted to the opposite end of the cylinder.

When the cutoff switch 24 is energized as shown in Figure 27, contact KR-1 closes to open the air valve 134 and thus engages the clutch, causing the cutoff knife to rotate and sever the extruded column. As explained above, the counterweight is effective to return the former cap immediately back to the die upon reaching the lower limit of its travel. As soon as the cam plate moves out of contact with the cutoff switch 24, the air valve winding 214 is deenergized so as to apply the brake and cause the cutoff knife to be stopped and retracted.

As the cap approaches its final position during upward movement, as shown in Figure 23, the switches 23 and 22 are tripped sequentially to apply the lubricant and lock the former cap as outlined above.

A manual selector switch 215 is also indicated in the circuit to provide manual locking and unlocking of the former cap. This switch is connected in line 216 and is adapted to establish a circuit selectively through the winding 205 or 206 to lock and unlock the cap. During automatic operation, the selector switch is placed in the neutral position shown.

A hydraulic supply system of conventional design is utilized for energizing the several power cylinders in response to the electrically operated valves. A detailed disclosure of the hydraulic system is omitted, however the supply and discharge lines to the valves and cylinders is shown diagrammatically in Figure 28. The electrically operated valve 105 for the former lock has a two-position slidable plunger which is operated by the two solenoid windings disclosed in the diagrams, the valve having suitable internal passageways (not shown) connected to the opposite ends of the cylinder for shifting the piston in response to the movements of the valve plunger.

The air supply for the cutoff knife, clutch-brake and lubricator preferably is delivered from a common air supply system (not shown). The clutch-brake valve has a two-position plunger which is spring loaded in the braking direction so that the brake is applied when the valve is deenergized. The lubricator valve is spring loaded in the closing direction and supplies lubricant when energized periodically.

The electrical circuit illustrated in Figure 29 provides the same basic automatic operation above described, but in addition, the circuit includes manually operated selector switches which permit certain of the operations to be performed either automatically or manually. This circuit includes the hand grip switch 35 which is mounted on the main press lever. This switch may be used selectively to open the former lock and also to operate the cutoff knife manually instead of automatically. Manual selector switches are provided for placing the former lock and cutoff knife under manual control by way of hand grip switch 35 as described later. The circuit also includes manually operated selector switches for decommissioning the automatic form closing circuit and automatic lubricator circuit.

As shown in Figure 29, the circuit is powered by the lines 200 and 201 as previously described and includes the lines 203 and 213 for operating the lubricator valve and cutoff knife switch. These two circuits include the relay contacts LR-1 and KR-1 which are operated by the LR and KR relays. The circuits for energizing these relays is substantially the same except that they now include the manual selector switches for decommissioning the lubricator and cutoff knife.

The relay contacts are associated with their operating relays in the line diagram located alongside the circuit diagram in the same manner as in Figure 28. As shown, the lubricator relay LR is connected in the line 204 previously described and is energized automatically by way of the lubricator switch 23, switch 23 being tripped momentarily during the upward movement of the cam plate 21. Line 204 includes the manually operated selector switch SS-1 which may be shifted to a position to open the circuit to relay LR in the event that automatic lubrication is unnecessary.

The cutoff knife relay KR is connected to the power lines by the line 212, the cutoff switch 24 being interposed in the line to provide automatic operation upon downward movement of the cam plate 21 in the manner previously described. In order to permit the cutoff operation to be performed manually, a circuit by way of line 217 is extended from the hand grip switch 35 on the press lever. Line 217 is connected to line 212 through the two-position manually operated selector switch SS-4. In the position shown in the diagram the selector switch is set for automatic operation, the circuit being completed from line 201 through the automatic cutoff switch 24, through switch SS-4, and through relay KR to line 200.

When the selector switch SS-4 is in its second position, the line from the automatic switch 24 is open and a circuit is established from power line 201, through the hand grip switch 35 to line 217. Line 217 includes the normally closed contact CR-3 of the closing relay CR. CR-3 is an interlocking contact and is in open position as shown when relay CR is energized, by way of the form closing switch 22, with the former lock in closed position. The purpose of placing normally closed contact CR-3 in the line is to prevent the cutoff knife from being operated by the hand grip switch 35 if the former lock is closed. In other words, when the former lock is closed, the cap will interfere with knife rotation (Figure 9); however contact CR-3 will be open and will prevent relay KR from being energized by the switch 35. Manual operation of the cutoff knife, by means of the hand grip switch 35 on the press lever, is desirable chiefly in forming large diameter pipes which are not extruded at sufficient velocity for automatic control. It is also used in cutting the pipes to a length different from that provided by the setting of the automatic switches.

The automatic form opening circuit by way of switch 26 to the form opening relay OR is basically the same as the circuit disclosed in Figure 28. As shown, the line 210 extends from power line 201 through switch 26 and switch SS–2 to line 210 which extends to relay OR and completes the circuit to line 200. When the press lever is shifted to the relief position, switch 26 will complete the circuit to relay OR, and relay OR in turn closes the normally open contact OR–1 in line 211. Line 211 in turn completes the circuit through the form opening winding 206 from line 201 through the winding and by way of line 213 to line 200. This opens normally closed interlocking contact OR–3 of line 208 and thus prevents the former lock from being closed until switch 22 is tripped by the cam plate at the end of the cycle.

Line 210 in the present diagram is provided with the manually operated switch SS–2 which provides manual opening of the former lock by operation of the hand grip switch 35 on the press lever. Switch SS–2 is a single pole double throw switch which in its second position, establishes a circuit from switch 35, line 217 and by way of branch line 220 to the second contact 221 of the switch SS–2. The normally open interlocking contact CR–2 (which is now closed) is interposed in line 229 and is adapted to prevent opening relay OR from being energized by the hand grip switch 35 unless the former lock is in closed position with relay CR energized by way of switch 22 by the cam plate as shown. When switch SS–2 is shifted to its second position, the circuit will be completed from power line 201 through hand grip switch 35, line 217, closed contact CR–2 to switch SS–2. The circuit is completed through switch SS–2 by way of line 210, through relay OR and through the line 210 to line 200.

When the selector switch SS–2 is in its second position, therefore, the automatic form opening switch 26 is inoperative upon swinging the press lever to relief position; instead the operator controls the opening of the form by tripping the hand grip switch 35. As noted above, the form is opened by the hand grip switch 35 chiefly in extruding large diameter pipes because the operation is necessarily slower. Also, in extruding relatively small size pipes the extruder need not be charged with fresh clay as frequently as in larger sizes; therefore, the operator may save time by moving the press lever just slightly beyond neutral to relieve extrusion pressure but without elevating the ram. This allows him to extrude a greater number of pipes before pausing to charge the extruder and thus brings about a saving in time.

Line 208, which energizes the closing winding 205 includes, in addition to contact CR–1, a normally closed contact OR–3 which is operated by the form opening relay OR. Contact OR–3 therefore provides an interlock which prevents the form from being closed unless the opening relay OR is deenergized with the form open.

It will be noted that the manual selector switch SS–4 includes a second pole 222 which moves in unison with the main pole indicated at 223. The second pole energizes a relay MR which energizes the cutoff motor 122. The contact MR–1 of relay MR is interposed in the line 224, the cutoff motor being energized continuously while the press is in operation whether the switch SS–4 is set for automatic or manual operation.

To recapitulate, the manually operated selector switches permit the operator to place the extrusion press either under full automatic control or to place selective operations partially under manual control and partially under automatic control. Operation of the selector switch SS–1, as explained above simply controls the operation of the automatic lubricator, decommissioning the lubricator when lubrication is not required. The actuation of the lubricator always depends upon the tripping of switch 23 by the cam plate whether switch SS–1 is opened or closed.

The selector switch SS–3, in the position shown, controls the closing of the form in response to the tripping of switch 22 by the cam plate or in its second position, by way of the manual switch 215. When selector switch SS–3 is shifted to its intermediate position with both of its contacts open, the opening and closing coils are both deenergized. When switch SS–3 is shifted to manual position (opposite to that shown), a circuit is completed from line 201 through line 216 to manual switch 215 which is normally in the intermediate position shown. When the switch is shifted to form closing position, CR relay is energized by way of lines 226 and 207. When the manual switch 215 is shifted to opening position, a circuit is completed through line 227 to the previously described circuit to the opening relay OR by way of contact 221 of selector switch SS–2.

The selector switch SS–4 permits the selection of automatic or manual operation of the cutoff knife. When the switch is in the position shown, the cutoff knife operates in response to the tripping of switch 24 by the cam plate of the downward limit of movement of the former cap. When selector switch SS–4 is placed in its second position, the circuit from switch 24 is open and the circuit is placed under the control of the hand grip switch 35 mounted on the press lever so that the operator is able to actuate the cutoff knife by hand. As explained above, the normally closed contact CR–3 is inserted in the line to prevent operation of the cutoff knife unless the form is open with the closing relay CR deenergized and with CR–3 closed.

The selector switch SS–2 may be shifted from the position shown to the second position, thus completing the circuit to the opening relay OR by way of switch 35 to permit the form to be opened by the hand grip switch. In the position shown, switch 26 opens the form automatically in response to movement of the press lever 27 to relief position. As explained above, the normally open contact CR–2 is interposed in the line to prevent the opening relay OR from being energized unless the closing relay CR is energized with the form closed as shown.

It will be noted from the foregoing, that the hand grip switch 35 performs one or two functions depending upon the position of the selector switches SS–2 and SS–4. At the second position of selector switch SS–4, hand grip switch 35 controls the operation of the cutoff knife and at the second position of selector switch SS–2 it controls the opening of the former lock.

When both selector switches SS–2 and SS–4 are set for manual control, the hand grip switch 35 controls both the former lock opening and the rotation of the cutoff knife. This double function is made possible by the interlocking contacts CR–2 and CR–3. As shown in Figure 29, CR–2 is normally open but is closed at the end of the cycle when the cam plate 21 closes switch 22, causing CR–2 to close. CR–2 thus provides a circuit from the hand grip switch 35 to opening relay OR at the beginning of the cycle. Closing the hand grip switch at this point does not actuate the cutoff knife because the normally closed contact CR–3 is open, the CR relay being energized.

After the socket is expressed and the former lock opened by hand grip switch 35 or by the press lever switch 26, normally open contact CR–2 will open because cam plate 21 will move down and open switch 22 to deenergize relay CR. As soon as relay CR is deenergized, normally closed contact CR–3 will close; thus, closing the circuit for driving the cutoff knife. The interlocking contacts CR–2 and CR–3 thus permit the two operations of opening the former lock and driving the cutoff knife to be controlled by the hand grip switch 35. Since both functions may be controlled from the hand grip switch, if the selector switches are set for manual control, control of the press manually is greatly simplified, thus improving the quality of the finished product and simplifying the movements of the press operator.

In order to permit control of the length of the pipes, the automatic switches 22, 23 and 24 are adjustably mounted upon the guideway 25. These switches are shifted to accommodate not only the length of the pipes but also to accommodate the automatic apparatus to the operating characteristics of various steam presses.

As detailed in Figure 30 and diagrammatically in Figure 25, the press lever switch 26 is tripped when the hand lever 27 is shifted to pressure relief position and is released when the lever is shifted further to charging position. For this purpose, switch 26 includes an arm 228 having a roller 229 which is engaged by a pin 230 extending from the press lever 27. The contacts of switch 26 are closed when the arm 228 is swung to pressure relief position shown in broken lines in Figure 30 and are opened when the arm swings to neutral position as indicated in full lines. Thus, the opening relay OR is energized momentarily whether the press lever is shifted momentarily to relief position or is shifted beyond to charging position. Switch 26 is unidirectional so that the opening relay is not energized a second time when the press lever is shifted to charging position then returned back to neutral or extruding position.

As stated previously, the switches 22, 23 and 24 are also unidirectional. These switches are provided with arms and rollers engaged by the cam plate 21 similar to switch 26 so that their contacts are closed only momentarily in response to movement of the cam plate in the appropriate direction.

Modified former

The modified hydraulic mechanism shown in Figure 31 is essentially the same in operation as the structure of Figure 6 except that the rocking yoke 103 is replaced by a sliding yoke bar 231. In the modified arrangement, the piston rod 112 is pivotally connected to a lug 232 fastened to the die so that the cylinder is shifted in alternate directions when hydraulic pressure is applied through the conduits 106—106. The rearward end of the cylinder is pivotally connected as at 110 to the yoke bar 231 so as to be shifted in unison with the cylinder. Bar 231 is slidably mounted upon studs 233—233 anchored in the die and traversing slots 234—234 formed in the bar.

The mechanism is shown in Figure 31 in locking position, corresponding to Figure 6 and it will be apparent that the application of hydraulic pressure to the opposite end of the cylinder will cause rotation of the spider to unlocking position. The arrangement in both instances is such that the full piston area is effective to unlock the former while the minor area is effective for locking. The greater force is applied in the unlocking direction because the former lock tends to bind in locked position after the clay socket is formed in it.

Modified switch arrangement

The modified arrangement shown in Figures 21 and 22 is adapted to provide the automatic operations above outlined by the use of photoelectric cells in place of the cam operated switches 22, 23 and 24. In place of the cam plate 21, a vane 21a is utilized, the vane being arranged to interrupt a light beam during the movements of the former cap instead of tripping the switches mechanically.

For this purpose, there is provided three photoelectric cells corresponding to the trip switches and indicated respectively at 22a, 23a and 24a positions corresponding to the switches. Respective light sources 22b, 23b and 24b are arranged to project beams of light indicated at 225 to the photocells. The photoelectric cells are connected to suitable amplifying circuits (not shown) and these circuits are interconnected in the control system to energize the relays in the same manner as the cam actuated switches 22, 23 and 24.

As the former camp and vane move vertically, the light beams are sequentially interrupted by the vane, causing the photoelectric cells to react upon the control circuit in the same manner as above outlined to energize the cutoff knife during downward movement and to operate the lubricator and close the former lock during upward movement. When used with the photoelectric cells in place of the trip switches, the remainder of the circuit, including the manually operated selector switches, the press lever actuated switch 26 and the hand grip switch 35 are interconnected in the circuit as above described to provide selective manual or automatic operation.

Having described my invention, I claim:

1. A cutoff mechanism for a clay pipe extruding machine, said extruding machine having an extrusion die adapted to extrude a clay column, the cutoff mechanism being adapted to sever the column; said cutoff mechanism comprising, a rotary drive shaft extending through said extrusion die, power means connected to the drive shaft for abruptly rotating said drive shaft, braking means connected to the drive shaft for abruptly stopping the rotation of the drive shaft, control means for regulating the operation of the power means and braking means, a mounting ring rotatably journalled upon the drive shaft and disposed adjacent the extrusion die, a cutoff knife having an inner end pivotally mounted upon said mounting ring, a gear sector mounted on said cutoff knife concentric to said pivotal mounting, a driving member nonrotatably mounted upon the drive shaft and meshing with said gear sector, said cutoff knife being normally maintained in a retracted position within the confines of the mounting ring, said driving element pivoting the cutoff knife by inertia to an extended position upon abrupt rotation of the drive shaft and driving element relative to the mounting ring, a stop element on the driving ring engageable with the cutoff knife in extended position whereby the torque of the drive shaft is effective to rotate the driving ring and cutoff knife in extended position through said driving element and gear sector, the cutoff knife pivoting to retracted position by inertia upon sudden stopping of said drive shaft by rotation of the mounting ring relative to the stationary drive shaft and driving element, whereby said driving element and gear sector are effective to pivot said knife to retracted position.

2. A cutoff mechanism for a clay pipe extruding machine, said extruding machine having an extrusion die adapted to extrude a clay column, the cutoff mechanism being adapted to sever the column; said cutoff mechanism comprising, a rotary drive shaft extending through said extrusion die, power means connected to the drive shaft for abruptly rotating said drive shaft, braking means connected to the drive shaft for abruptly stopping the rotation of the drive shaft, control means connected to the said power means and braking means for regulating the operation of the power means and braking means, a mounting ring rotatably journalled upon the drive shaft and disposed adjacent the extrusion die, a cutoff knife having an inner end pivotally mounted upon said mounting ring, a gear sector mounted on said cutoff knife, concentric to said pivotal mounting, a driving disk nonrotatably mounted upon the end of the drive shaft, said disk having a series of spaced pins located in an arc concentric to the axis of the drive shaft, said pins extending outwardly from the surface of the disk on the side opposite the drive shaft and meshing with said gear sector, said cutoff knife being normally maintained in a retracted position within the confines of the mounting ring, said driving disk pins pivoting the cutoff knife by inertia to an extended position upon abrupt rotation of the drive shaft and disk relative to the mounting ring, a stop pin mounted on the driving ring engageable with the cutoff knife in extended position whereby the torque of the drive shaft is effective to rotate the driving ring and cutoff knife in extended position through engagement of said driving disk pins and gear sector, the cutoff knife pivoting to retracted position by inertia upon sudden stopping of said drive shaft by rotation of the mounting ring relative to the stationary drive shaft and driving disk, whereby said driving disk and gear sector are effective to pivot said knife to retracted position.

3. A combined cutoff and lubricator apparatus for a clay pipe extruding machine, said extruding machine having an extrusion die adapted to form the outside diameter of the pipe, the machine having a former die adjacent said extrusion die and a former cap movable axially with respect to the former die; said cutoff mechanism and lubricator head comprising a rotatable drive shaft extending through the extrusion die, the shaft having a lubricant bore extending axially therethrough, power means connected to the shaft for starting and stopping the rotation of said drive shaft, a lubricant supply system communicating with said bore to supply lubricant to the lubricant bore, lubricant discharge means mounted upon the drive shaft in communication with said bore and located within the former die to discharge the lubricant within the former die, a cutoff knife mounted on said drive shaft to sever the extruded pipe upon rotation of the drive shaft, and control means connected to said lubricant supply system and to said power means to regulate the operation thereof.

4. A combined cutoff and lubricator apparatus for a clay pipe extruding machine, said extruding machine having an extrusion die adapted to form the outside diameter of the pipe and an internal mandrel adapted to form the inside diameter of the pipe, the machine having a former die adjacent said extrusion die and a former cap movable axially with respect to the former die and adapted to nest within the former die and thereby form a pipe socket; said combined cutoff and lubricator apparatus comprising, a drive shaft extending through the mandrel and rotatable with respect to the mandrel, said shaft having a lubricant bore extending axially therethrough, power means connected to the drive shaft for starting and stopping the rotation of said drive shaft, a lubricant supply system communicating with said bore to supply lubricant to the lubricant bore, lubricant discharge means mounted upon the drive shaft in communication with said bore to discharge the lubricant within the former die, a cutoff knife mounted upon the drive shaft and disposed within the former die, the cutoff knife severing the extruded pipe upon rotation of the cutoff knife, control means connected to the power means and having a trip member, a tripping device connected to the former cap and engageable with said trip member upon movement of the former cap away from the former die to cause rotation of the drive shaft, and a second control means connected to the lubricant supply system and having a trip member engaged by said tripping device upon movement of the former cap toward the former die to supply lubricant to the lubricant discharge means.

5. A combined cutoff and lubricator apparatus for a clay pipe extruding machine, said extruding machine having an extrusion die adapted to form the outside diameter of the pipe and an internal mandrel adapted to form the inside diameter of the pipe, the machine having a former die adjacent said extrusion die and a former cap movable with respect to the former die; said cutoff and lubricator apparatus comprising, a drive shaft extending through the mandrel and adapted to be rotated with respect to the mandrel, a lubricant bore extending axially through said shaft, power means for abruptly starting and stopping the rotation of said drive shaft, a lubricant supply system communicating with said lubricating bore and providing a mixture of air and lubricant, a swivel joint connecting the lubricant bore to the lubricant supply system to supply the lubricant mixture to the bore of the drive shaft, a cutoff knife mounting ring rotatably mounted upon the drive shaft within the former die, an extensible cutoff knife pivotally mounted on said driving ring, a driving disk non-rotatably mounted upon the drive shaft and in driving connection with the cutoff knife, the driving disk pivoting the cutoff knife to an extended position by inertia upon rotation of the drive shaft, thereby to sever the extruded pipe, said driving disk retracting the cutoff knife upon stopping of the drive shaft, said driving disk having lubricant discharge openings therethrough in communication with the lubricant bore, and control means connected to the lubricant supply system and to said power means to regulate the operation thereof.

6. A power operated former lock mechanism for a clay pipe extrusion machine, said machine having a manually operated control member which is shiftable to one position for starting the extrusion of clay and to a second position for stopping the same, the extrusion machine having a stationary former die and an axially movable former cap which nests within the former die to form a pipe socket; said former lock mechanism comprising, a locking member rotatably mounted upon the former cap and having a plurality of locking arms and an actuating arm extending outwardly therefrom, a plurality of wedging hooks extending from the former die, said locking arms engaging said wedging hooks upon rotation of the locking member in locking direction with the cap nested within the die and locking the cap to the die for extruding a pipe socket therein, a yoke shiftably mounted upon the former die and engageable with said actuating arm when the cap is nested within the die, a power motor connected to the yoke for shifting the yoke and locking element in unlocking direction, an electrical cap unlocking switch mounted adjacent the manual control lever, said switch electrically interconnected with said power motor to energize the same to unlock the cap when the switch is tripped, and a trip element extending from said switch and engageable by the control member when the lever is shifted to said second position to stop the extrusion, thereby to trip the switch and energize said motor to unlock the cap after the socket of the pipe is formed.

7. A power operated former lock mechanism for a clay pipe extrusion machine, said machine having a stationary former die and an axially movable former cap which nests within the former die to form a pipe socket; said former lock mechanism comprising, a locking member rotatably mounted upon the former cap and having a plurality of locking arms and an actuating arm extending outwardly therefrom, a plurality of wedging hooks extending from the former die, said locking arms engaging said wedging hooks upon rotation of the locking member in locking direction with the cap nested within the die and locking the cap to the die for extruding a pipe socket, a yoke shiftably mounted upon the former die and engageable with said actuating arm when the cap is nested within the die, a power motor connected to the yoke for shifting the yoke and rotating the locking member in locking direction, an electrical cap locking switch mounted adjacent the path of movement of the cap, said switch electrically interconnected with said power motor to energize the same, and a trip device connected to the cap for movement therewith, said cap locking switch having a trip element engaged by said tripping device to trip the switch when the cap moves into nested position within the die with said actuating arm engaged by said yoke, thereby to lock the cap to the die.

8. A power operated former lock mechanism for a clay pipe extrusion machine, said machine having a manually operated control member which is shiftable to one position for starting the extrusion of clay and to a second position for stopping the same, the extrusion machine having a stationary former die and an axially movable former cap which nests within the former die to form a pipe socket; said former lock mechanism comprising, a locking member rotatably mounted upon the former cap and having a plurality of locking arms and an actuating arm extending outwardly therefrom, a plurality of wedging hooks extending from the former die, said locking arms engaging said wedging hooks upon rotation of the locking member in locking direction with the cap nested within the die and locking the cap to the die for extruding a pipe socket therein, a yoke shiftably mounted upon the former die and engageable with said actuating arm when the cap is nested within the die, a reversible power motor connected to the yoke for shifting the yoke and locking element in locking and unlocking directions, an electrical cap unlocking switch mounted adjacent the manual control lever, said switch electrically interconnected with said power motor to energize the same in cap unlocking direction when the switch is tripped, a trip element extending from said switch and engageable by the control lever when the lever is shifted to said second position to stop the extrusion, thereby to trip the switch and energize said motor to unlock the cap after the socket of the pipe is formed, the cap being propelled axially from the die when the manual lever is shifted to said first position to start the extrusion and form the pipe, an electrical cap locking switch mounted adjacent the path of movement of the cap, said switch electrically interconnected with said power motor to energize the same in cap locking direction, and a trip device connected to the cap for movement therewith, said cap locking switch having a trip element engaged by said tripping device to trip the switch when the cap returns to nested position within the die with said actuating arm engaged by said yoke, thereby to lock the cap to the die.

9. A die lubricating apparatus for a clay pipe extruding machine, said machine having an extrusion die including a former die at the lower end thereof and an axially movable former cap; said lubricating apparatus comprising, a tube extending axially through the extrusion die, a perforated lubricant nozzle attached to the lower end of said tube and disposed within the former die in a position to spray lubricant upon the internal surface of the former die, the upper portion of the extrusion die having a lubricant passageway communicating with the upper end of said tube, lubricant supply means communicating with said passageway for delivery of lubricant to said nozzle and including a normally closed electrically operated lubricant valve, and lubricant switch means electrically connected to said normally closed lubricant valve to open the valve, thereby to spray lubricant for deposit upon the internal surface of the former die.

10. A die lubricating apparatus for a clay pipe extruding machine, said machine having an extrusion die including a former die at the lower end thereof and an axially movable former cap which nests within the die to form a pipe socket, the former cap being biased toward the former die and being moved by the extruding pipe away from the die; said lubricating apparatus comprising, a tube extending axially through the extrusion die, a perforated lubricant nozzle attached to the lower end of said tube and disposed in a position to spray lubricant upon the internal surface of the former die, lubricant supply means communicating with said tube including a normally closed electrically operated lubricant valve, a lubricant control switch in electrical connection with said control valve to open the lubricant valve upon being tripped, and a switch tripping element connected to the former cap for movement therewith, the said lubricant control switch having an arm element projecting into the path of movement of the switch tripping element, the lubricant control switch being mounted in stationary position and the switch tripping element being mounted relative to the cap in position to trip said arm element when the cap is in proximity to the former die, thereby to trip the lubricant control switch and open the lubricant valve as the cap is biased into proximity of the die to deposit a film of the lubricant upon the surfaces of the former cap and die.

11. A pipe severing and die lubricating apparatus for a clay pipe extrusion machine, said machine having an extrusion die including a former die at the lower end thereof and a former cap which is movable axially relative to the die and which is biased toward the die, the cap being moved by the extruding pipe at a sufficient speed to travel by inertia a substantial distance beyond the end of the pipe when the extrusion is stopped, leaving the extruded pipe suspended from the former die; said severing and lubricating apparatus comprising, a vertical drive shaft extending axially through the extrusion die, the shaft having a lubricant bore extending therethrough, power means connected to said drive shaft for rotating the same, a knife mounting element secured upon the lower end of the vertical drive shaft and disposed within the former die, a cutoff knife mounted upon said mounting element for severing the pipe upon rotation of the knife mounting element, lubricant supply means communicating with the bore of said shaft and including a normally closed electrically operated lubricant valve, said knife mounting element having lubricant openings therein communicating with the bore of said shaft, cutoff switch means electrically connected to said power means for rotating said drive shaft when the former cap travels by inertia beyond the end of the pipe to sever the suspended pipe, and lubricant switch means electrically connected to said normally closed lubricant valve for opening the same as the cap is biased back toward the die to discharge lubricant through the perforations of said knife mounting element for deposit upon the surfaces of the former die and cap.

12. A pipe severing and die lubricating apparatus for a clay pipe extrusion machine, said machine having an extrusion die including a forming die at the lower end thereof and a former cap which is movable axially relative to the die and which is biased toward the die, the cap being moved by the extruding pipe at a sufficient speed to travel by inertia a substantial distance beyond the end of the pipe when the extrusion is stopped, leaving the extruded pipe suspended from the former die; said severing and lubricating apparatus comprising, a vertical drive shaft extending axially through the extrusion die, the shaft having a lubricant bore extending therethrough, power means connected to said drive shaft for rotating the same, a knife mounting element secured upon the lower end of the vertical drive shaft and disposed within the former die, a cutoff knife mounted upon said mounting element for severing the pipe upon rotation of the knife mounting element, lubricant supply means communicating with the bore of said shaft including an electrically operated lubricant valve, a switch tripping device connected to the former cap for movement therewith, a stationary cutoff switch having an arm element projecting in the path of movement of the switch tripping device and electrically connected with said power means for energizing the power means upon tripping thereof, said arm element located in a position to trip said switch when the former cap travels by inertia beyond the end of the pipe, thereby to sever the suspended pipe, and a stationary lubricant switch having a switch arm projecting into the path of movement of the switch tripping device and located in a position to be tripped when the cap is in proximity to the forming die, the lubricant switch being in electrical connection with the electrically operated lubricant valve to open the same and discharge lubricant through said perforations for deposit upon the surfaces of the cap and die upon tripping thereof.

References Cited in the file of this patent
UNITED STATES PATENTS

| | | |
|---|---|---|
| 1,558,030 | Martin | Oct. 20, 1925 |
| 1,651,203 | Hibbins | Nov. 29, 1927 |
| 1,651,205 | Hibbins | Nov. 29, 1927 |
| 1,875,738 | Jones | Sept. 6, 1932 |
| 1,978,420 | Dyer | Oct. 30, 1934 |
| 2,282,282 | Hamlen | May 5, 1942 |
| 2,480,442 | Booth | Aug. 30, 1949 |
| 2,645,835 | Bennett et al. | July 21, 1953 |

FOREIGN PATENTS

| | | |
|---|---|---|
| 13,028 | Great Britain | June 10, 1898 |
| 490,079 | Great Britain | Aug. 9, 1938 |